(12) United States Patent
Ware et al.

(10) Patent No.: US 9,316,731 B2
(45) Date of Patent: Apr. 19, 2016

(54) LOW-COST TRACKING SYSTEM

(75) Inventors: Frederick A. Ware, Los Altos Hills, CA (US); Farshid Aryanfar, Sunnyvale, CA (US); John Brooks, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/234,623

(22) PCT Filed: Aug. 3, 2012

(86) PCT No.: PCT/US2012/049633
§ 371 (c)(1),
(2), (4) Date: Jan. 23, 2014

(87) PCT Pub. No.: WO2013/020105
PCT Pub. Date: Feb. 7, 2013

(65) Prior Publication Data
US 2014/0159961 A1    Jun. 12, 2014

Related U.S. Application Data

(60) Provisional application No. 61/515,129, filed on Aug. 4, 2011.

(51) Int. Cl.
*G01S 13/84* (2006.01)
*G01S 5/02* (2010.01)
*G01S 5/06* (2006.01)
(Continued)

(52) U.S. Cl.
CPC ............... *G01S 13/84* (2013.01); *G01S 5/0294* (2013.01); *G01S 5/06* (2013.01); *G01S 13/878* (2013.01); *G01S 7/52004* (2013.01); *G01S 2007/4091* (2013.01)

(58) Field of Classification Search
CPC .................. G01S 13/36–13/40; G01S 15/36; G01S 17/36; G01S 5/02; G01S 13/878; G01S 12/84
USPC ............................................. 342/463, 386, 394
See application file for complete search history.

(56) References Cited

U.S. PATENT DOCUMENTS 2,632,157 A * 3/1953 Jones ............................. 342/46
3,068,470 A * 12/1962 Werner et al. ................. 342/119
(Continued)

OTHER PUBLICATIONS

International Search Report, Written Opinion and Notice of Transmittal of same mailed Feb. 26, 2013 in International Application PCT/US2012/049633.

*Primary Examiner* — Gregory C Issing
*Assistant Examiner* — Fred H Mull
(74) *Attorney, Agent, or Firm* — Fenwick & West LLP

(57) ABSTRACT

A method of tracking a second electronic device with respect to a first electronic device is disclosed. The method includes transmitting a first waveform of a first frequency along a first fixed path associated with the first device. A second waveform having a frequency based on the first frequency is wirelessly transmitted from the first device to the second device along a first wireless path. The second waveform is wirelessly transmitted from the second device to the first device along a second wireless path. The first and second waveforms are received at the phase comparator circuit. A first phase relationship of the received first waveform is then compared to a second phase relationship of the received re-transmitted waveform. A coordinate of the second device is determined with respect to a reference coordinate based on the comparing.

12 Claims, 29 Drawing Sheets

(51) Int. Cl.
    *G01S 13/87* (2006.01)
    *G01S 7/40* (2006.01)
    *G01S 7/52* (2006.01)

(56) References Cited

U.S. PATENT DOCUMENTS

| | | | | |
|---|---|---|---|---|
| 3,243,812 | A * | 3/1966 | Williams | 342/125 |
| 3,290,677 | A * | 12/1966 | Jacob | 342/23 |
| 3,438,032 | A * | 4/1969 | Cook | 342/125 |
| 3,780,370 | A * | 12/1973 | Reeves | 342/61 |
| 4,450,444 | A * | 5/1984 | Wehner et al. | 342/25 F |
| 5,225,841 | A * | 7/1993 | Krikorian et al. | 342/204 |
| 5,654,715 | A * | 8/1997 | Hayashikura et al. | 342/70 |
| 6,040,898 | A * | 3/2000 | Mrosik et al. | 356/5.09 |
| 6,043,774 | A * | 3/2000 | Singh et al. | 342/127 |
| 6,331,964 | B1 * | 12/2001 | Barone | 367/128 |
| 6,346,878 | B1 * | 2/2002 | Pohlman et al. | 340/435 |
| 6,363,106 | B1 * | 3/2002 | Popovic et al. | 375/150 |
| 6,388,755 | B1 * | 5/2002 | Zhao et al. | 356/614 |
| 6,674,403 | B2 | 1/2004 | Gray et al. | |
| 6,801,156 | B1 * | 10/2004 | Wasiewicz | 342/95 |
| 7,190,305 | B2 * | 3/2007 | Isaji | 342/70 |
| 2004/0122315 | A1 | 6/2004 | Krill | |
| 2006/0210102 | A1 | 9/2006 | Zalalutdinov et al. | |
| 2007/0001897 | A1 * | 1/2007 | Alland | 342/70 |
| 2007/0013578 | A1 * | 1/2007 | Iritani et al. | 342/118 |
| 2008/0316103 | A1 * | 12/2008 | Rofougaran et al. | 342/386 |
| 2009/0167607 | A1 | 7/2009 | Holder | |
| 2009/0237305 | A1 | 9/2009 | Rudolph | |
| 2010/0214157 | A1 * | 8/2010 | McEwan | 342/173 |
| 2011/0047709 | A1 * | 3/2011 | Tarsaud et al. | 5/710 |
| 2014/0194142 | A1 * | 7/2014 | Hedley et al. | 455/456.1 |

\* cited by examiner

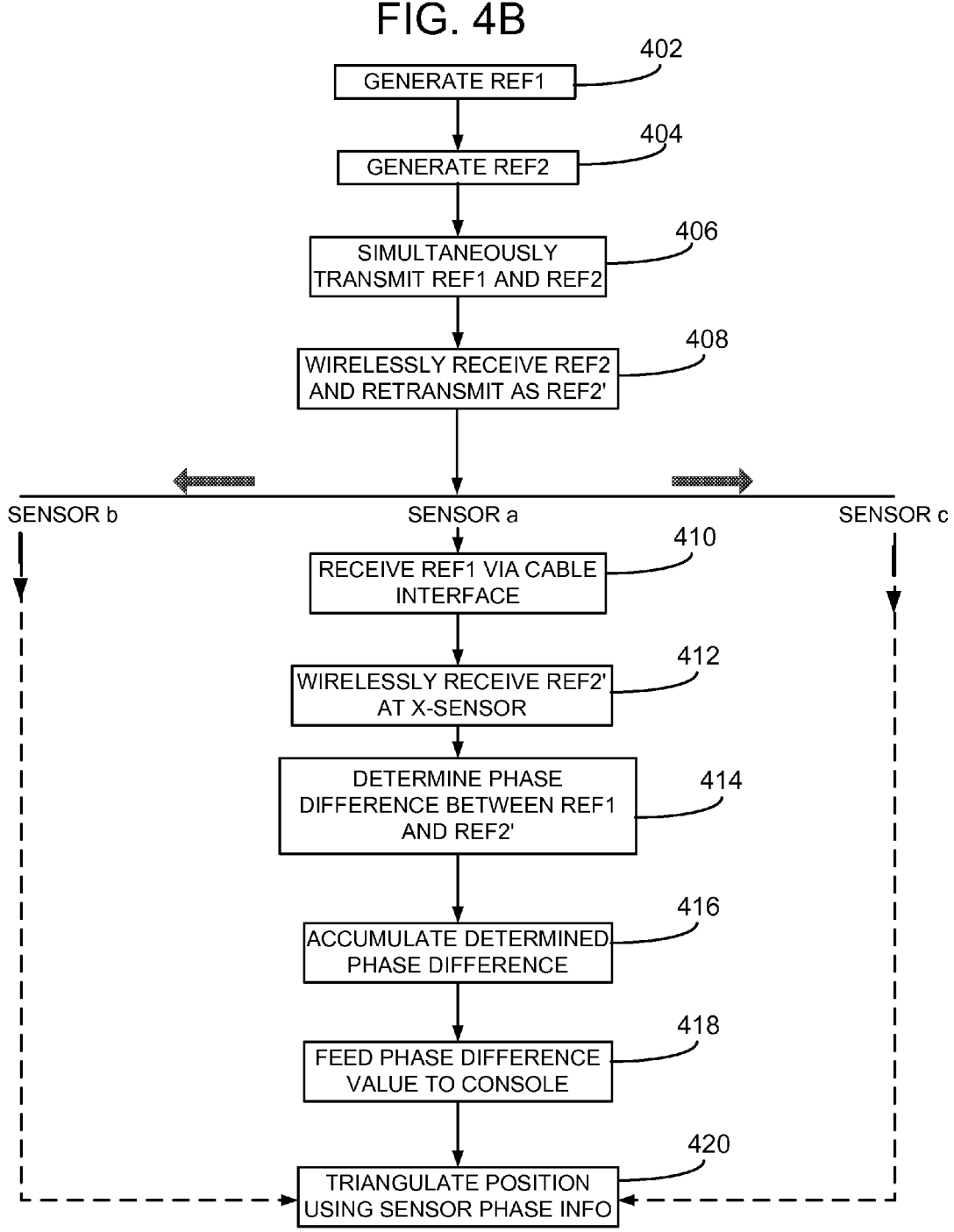

Influence of the human tissue to the optimum frequency

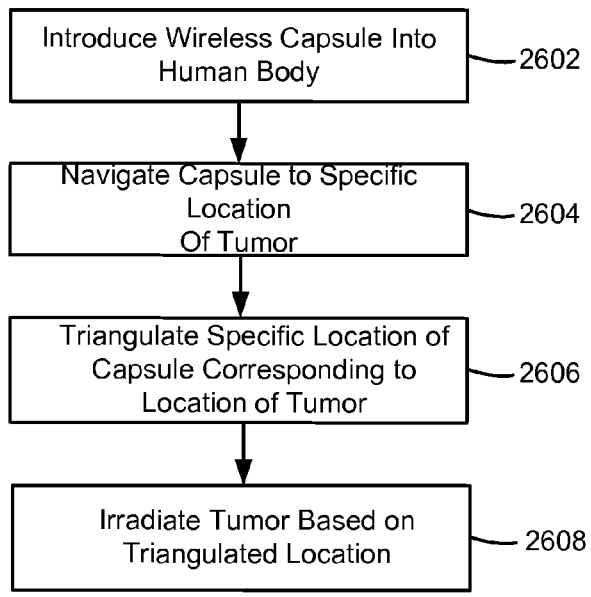
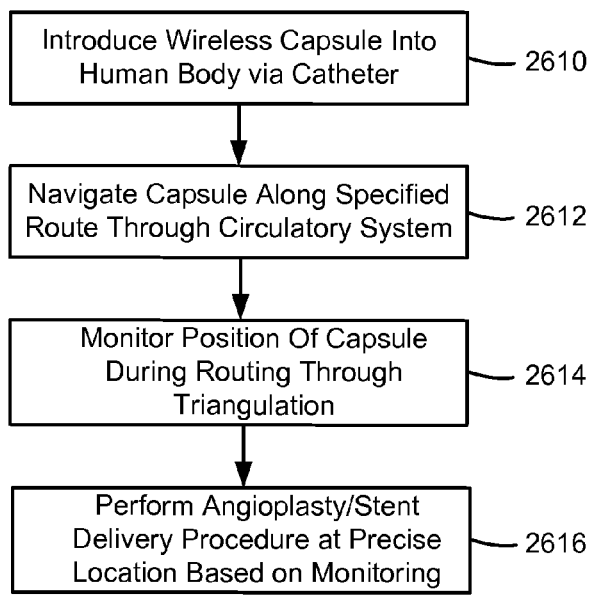

LOW-COST TRACKING SYSTEM

CROSS-REFERENCE TO RELATED APPLICATIONS/TECHNICAL FIELD

Pursuant to 35 U.S.C. §365, this application claims priority from International Application No. PCT/US2012/049633 published as WO 2013/020105 A2 on Feb. 7, 2013, which claims priority from U.S. Provisional Application No. 61/515,129, filed Aug. 4, 2011 and entitled "LOW-COST TRACKING SYSTEM FOR GAMING SYSTEMS". International Application No. PCT/US2012/049633 and U.S. Provisional Application No. 61/515,129 are hereby incorporated by reference in their entirety.

TECHNICAL FIELD

The disclosure herein relates to wireless communication systems and methods and more particularly to wireless tracking systems and methods that establish the location of a target electronic device with respect to a tracking electronic device.

BACKGROUND

Wireless tracking systems are often used in large-scale military and commercial transportation applications. Recently, miniaturized tracking systems are being employed in various consumer and medical fields. As an example, recent trends in video gaming software now take advantage of controller position data that reflect movement of the controller relative to the console. Position detection enables the video game software to render images based on the controller position during gameplay. This enhances the user experience in a variety of ways.

One proposal for a game console tracking system employs multiple cameras facing a user. Gestures made by the user may be captured by the cameras and processed to render a depth of field that may be correspondingly analyzed to determine the controller position with respect to the cameras. A further example also utilizes a user-facing camera, but determines position based on the movement of an object, such as a colored illuminated ball, mounted to the controller that exhibits a detectable brightness that highly contrasts the brightness associated with an ambient room environment. Limitations of the camera approach often include [1] cost; [2] image processing complexities and associated burdens; [3] X-Y dimension pixel density resolution constraints; and [4] Z dimension resolution inconsistencies when compared to the X-Y dimensions.

For medical applications, tracking a position of, for example, a catheter being positioned in a patient, may involve the use of expensive imaging equipment. Moreover, for certain medical treatments, such as radiation therapy for cancerous tumors, pinpointing a precise location of a tumor, even during body movements, can be a very challenging task in an effort to reduce irradiating normal tissue.

Although each of the proposals noted above work well for their intended applications, it would be desirable to have a less costly and more straightforward approach to determining a target's position in absolute space.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 4B illustrates a flowchart setting forth a method of operation for the tracking system of FIG. 1;

FIG. 16b illustrates one embodiment of a multiplexer employed in the fractional phase delay circuit of FIG. 16a;

FIG. 16c illustrates one embodiment of an interpolator shown in the fractional phase delay circuit of FIG. 16a;

FIG. 26A illustrates a flowchart of steps for a method of applying a radiation treatment to a cancerous tumor in a human body;

FIG. 26B illustrates a flowchart of steps for a method of performing an angioplasty/stent delivery procedure in a human body;

DETAILED DESCRIPTION

Embodiments of an electronic device for wirelessly tracking the position of a second electronic device (target device) are disclosed. In one embodiment, a tracking circuit for detecting the position of a target device is disclosed. The tracking circuit includes transmit circuitry having a reference signal source to generate and send a reference waveform at a first frequency along a fixed path. A wireless transmitter couples to the reference signal source to generate a wireless signal based on the reference waveform at the first frequency for propagation to the target device along a first wireless path. The tracking circuit includes sensor circuitry having a first receiver to receive a retransmitted broadcast of the wireless signal from the target device along a second wireless path, and phase comparison circuitry having a first input to receive the reference waveform and a second input to receive the re-transmitted signal. The phase comparison circuitry includes an output indicative of a phase difference between the reference waveform and the received re-transmitted waveform. The phase difference represents a position coordinate of the target device with respect to a reference coordinate.

In another embodiment, a wireless controller for interfacing with a game console tracking circuit is disclosed. The wireless controller includes a receive circuit to receive a first omnidirectional waveform at a first frequency from the tracking circuit and a transmit circuit. The transmit circuit re-transmits the waveform to the tracking circuit for comparison to a reference waveform.

In yet another embodiment, a method of tracking a second electronic device with respect to a first electronic device is disclosed. The method includes transmitting a first waveform of a first frequency along a first fixed path associated with the first device. A second waveform having a frequency based on the first frequency is wirelessly transmitted from the first device to the second device along a first wireless path. The second waveform is wirelessly transmitted from the second device to the first device along a second wireless path. The first and second waveforms are received at the phase comparator circuit. A first phase relationship of the received first waveform is then compared to a second phase relationship of the received re-transmitted waveform. A coordinate of the second device is determined with respect to a reference coordinate based on the comparing.

System Overview

Figure 1:
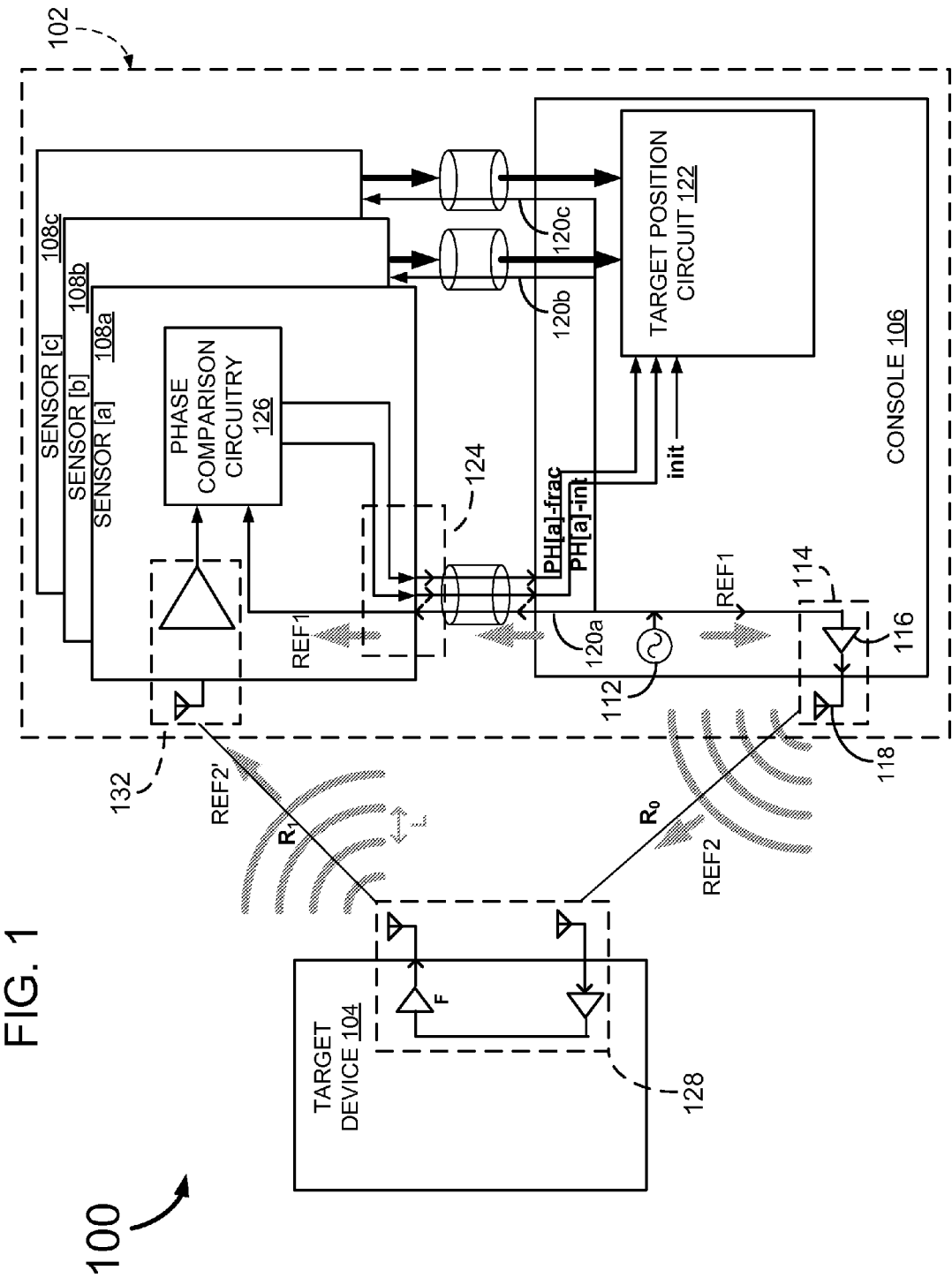
FIG. 1 illustrates a block diagram of one embodiment of a tracking system employing a target device and a tracking device.

Referring now to FIG. 1, one embodiment of a wireless device tracking system, generally designated 100, includes a tracking circuit 102 that wirelessly tracks the position of a target device 104, such as a gaming controller or a portion of a moveable medical device such as a catheter. In one specific embodiment, the tracking circuit 102 is realized by a gaming or medical device console 106 that interfaces with a plurality of sensor circuits 108a-108c via respective cables 110a-110c. In one embodiment, the tracking circuit 102 triangulates the position of the target device 104 based on relative phase measurements of various reference signals and an initialization process.

Further referring to FIG. 1, the console 106 includes a reference signal source 112 that generates a periodic monotone reference signal REF1 of a predetermined frequency. In one embodiment, the reference signal REF1 is processed for wireless transmission as a wireless reference signal REF2 by a first antenna interface circuit 114. In one embodiment, the antenna interface circuit includes a power amplifier 116 coupled to an antenna element 118 capable of emitting a continuous-wave, non-directional RF signal. In a specific embodiment, a 2.5 GHz RF signal is generated, resulting in wavelengths of approximately 12 cm. Other embodiments may employ circuits capable of transmitting other forms of non-wireline signals, such as acoustic or ultrasonic signals. The reference signal source 112 also feeds the reference signal REF1 along a fixed wired path 120 for distribution to the plurality of sensor circuits 108a-108c via the respective cable interfaces 110a-110c. A target position circuit 122 receives phase information from the plurality of sensor circuits to calculate the position of the target device 104 with respect to a baseline reference position. The relationship of the various wave parameters is:

$$L/T=C$$

where L=wavelength (or cycle length);
T=cycle time;
C is the propagation speed; and
F=the frequency=1/T.

To further understand the various relationships identified herein, the propagation speed C of electromagnetic radiation in free space is about $3*10^{10}$ cm/s. It is reduced by a scale factor of $epsilon^{-0.5}$ on a transmission line, where epsilon is the relative dielectric constant between the conductors. The propagation speed C of acoustic (sound) waves in air is about $3*10^{4}$ cm/s.

With continued reference to FIG. 1, the plurality of sensor circuits 108a-108c correspond to respective coordinate axes in 3-dimensional space. Each sensor circuit includes a wireless receiver 132 having an antenna interface that is configured to receive the retransmitted wireless reference signal REF2'. A cable interface 124 couples to a phase comparison circuit 126. The phase comparison circuit includes inputs to receive the wired reference signal REF1 generated at the console 106 and the wirelessly received re-transmission of the reference signal REF2' from the receiver 132. Respective integer and fractional phase offset values PH[a]-int and PH[a]-frac are maintained and output from the phase comparison circuit 126 to the controller position circuit 122 such that a position coordinate corresponding to the values may be determined based on the other coordinate data from the other sensor circuits.

Throughout this document, the term "phase" is most often used to mean a fraction of a cycle of a periodic signal. This may be represented numerically as a decimal number in the range of 0.0000 . . . to 0.9999. The phase may also be represented as a binary fraction, as an angle in degrees or radians, or by any other equivalent method. The phase can be used to indicate a time or distance value which is a fraction of the cycle time or wavelength distance of a periodic signal. The propagation path of a signal (on a wire or in free space or any other medium) can be measured by time or distance as a phase total, which includes an integer number of cycles plus a fraction of one cycle. The relative phase at the end of the propagation path is this fractional value, and this is what is directly measured by the system illustrated in FIG. 1.

The target device 104, in one embodiment, takes the form of a mobile controller that provides the object for tracking data that may be used by video game software to show relative movement in real-time during game-play by one or more users. In a further embodiment, the target device takes the form of an indicator for insertion into a human body. The target device 104 employs an antenna transceiver interface 128 capable of receiving the wireless reference signal REF2 from the console 106 along a first wireless path $R_0$, and retransmitting a form of the reference signal REF2' from the target device to each of the sensors 108a-108c along a plurality of second reference paths $R_{1(X)}$, $R_{1(Y)}$, and $R_{1(Z)}$. The transceiver interface 128 may employ separate antenna elements or the same element to transmit and receive the wireless signals.

At a high level, by determining the relative flight times between the wired reference signal REF1 on the fixed paths 120a-120c to the wireless reference signals REF2 and REF2' propagating along the combined first and second wireless paths, and compensating for the relative phase delays, the position of the controller 104 may be determined with respect to a calibrated initial position in a straightforward manner. For clarity purposes, enhancements to the basic system above are described below in the context of other embodiments. The further embodiments describe features that address, for example, interference between the console transmitter 116 and the controller transceiver circuitry 128, self-interference due to reflections from the environment, and initialization of the integer portion of the propagation path phase total.

Figure 2:
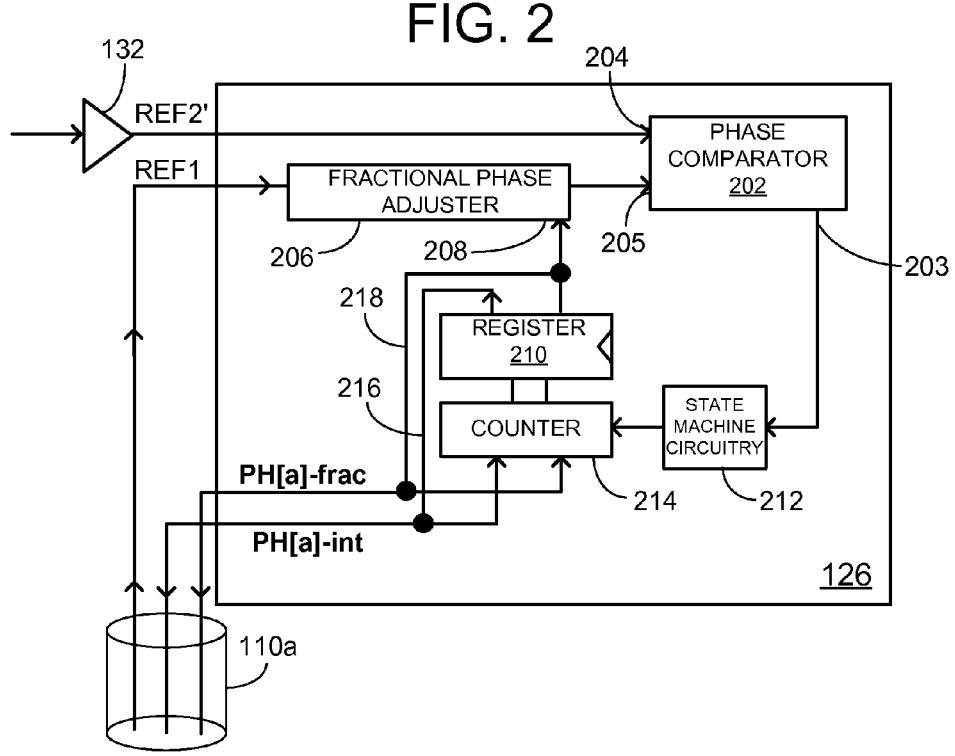
FIG. 2 illustrates a block diagram of one embodiment of a sensor circuit within the tracking electronic device of FIG. 1.

FIG. 2 illustrates one embodiment of the phase comparison circuit 126 disposed in each of the plurality of sensor circuits 108a-108c. Throughout this disclosure, the terms "sensor circuit" and "sensor" may be used interchangeably and generally represent the same circuit structure. The sensor circuitry includes a phase comparator 202 having a first input 204 to generally receive a form of the wireless reference signal REF2' transmitted by the target device 104, and a second input 205 to receive a phase-adjusted version of the wired reference signal REF1 (fed from the console 106). The phase adjusting, or delay applied to the wired reference signal REF1, is performed by a fractional phase adjust circuit 206 that delays the reference signal by a fractional portion of a single cycle of the reference signal REF1 frequency F to generate a phase adjusted signal REF1'. The phase comparator 202 includes an output 203 for feeding a signal indicative of the magnitude of a phase error between the fractionally phase-adjusted wired reference signal REF1' and the received wireless reference signal REF2'.

Further referring to FIG. 2, the fractional phase adjust circuit 206 includes a phase adjust input 208 responsive to a phase register 210 that stores a running phase difference value between the wired and wireless reference signals REF1 and REF2'. The phase difference value is a phase total, including both integer and fractional portions of the accumulated phase. The fractional portion of this value controls the delay applied to the wired reference signal REF1 noted above. The delay applied to the wired reference signal is unaffected by the integer phase value. The value in the phase register 210 is based on the output from the phase comparator 202, which represents a direction of phase mismatch that is fed to a finite state machine 212. The finite state machine generates an increment or decrement control signal based on the phase comparator output signal. A counter 214 receives the control signal from the finite state machine 212 to increment or decrement the phase register value. A carry/borrow portion of the fractional part of the phase value will propagate into the integer part of the phase value. Updated values in the phase register 210 will cause a delayed phase signal F" to move in the direction to match the phase of the received signal 204. The integer and fractional portions of the phase value are fed along respective paths 216 and 218 back to the counter 214 and also fed through the cable interface 110a, 110b, or 110c to the controller position circuit 122.

Figure 3:
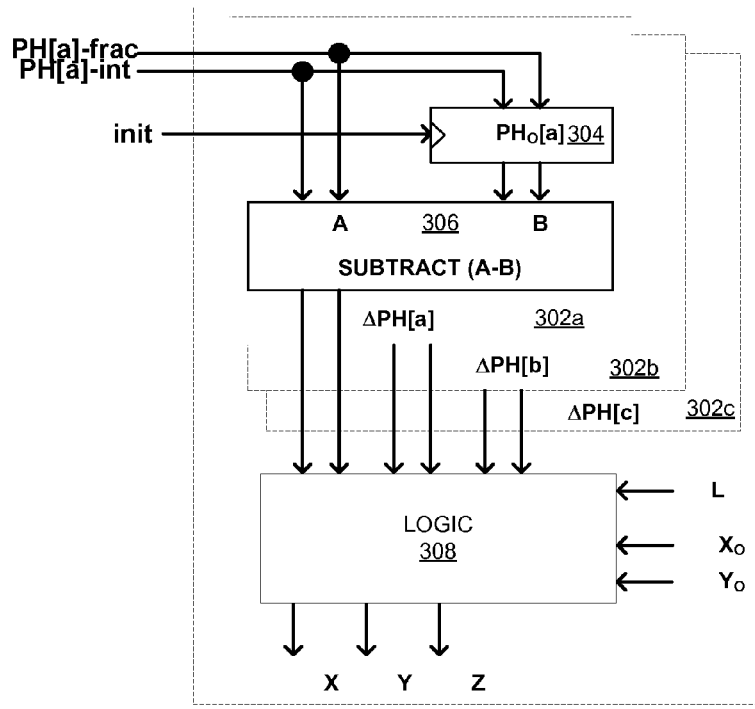
FIG. 3 illustrates a block diagram of one embodiment of a controller position circuit employed in the tracking device of FIG. 1.

FIG. 3 illustrates additional detail pertaining to one embodiment of the target or controller position circuit 122. The circuit includes plural compensation circuits 302a-302c corresponding to each position coordinate X, Y and Z. Each compensation circuit includes an initialization phase value register 304 responsive to a reset signal "init" for storing a calibrated reference phase value, and a subtraction or difference circuit 306. Applying the "init" signal to the initialization register 304 initializes the integer and fractional phase total. An alternative way to initialize the integer and fractional phase total is to send the "init" signal in the cable 110a to force the register 210 to a predefined value.

Further referring to FIG. 3, the difference circuit receives the current value of the respective integer and fractional phase totals from the sensor circuits 108a-108c, and the calibrated reference phase values and determines the phase offsets, or difference values ΔPH[a]-ΔPH[c], between the calibrated reference phase values and the actual phase values for each coordinate. This is carried out in an ongoing manner such that as the values of the integer and fractional phase totals change during operation, the initialization values will be subtracted from them, yielding the difference values. Each difference value represents the change in the propagation path of the received signal (for a given sensor circuit) relative to the moment of initialization. The difference values are all fed to and combined at logic 308, that also receives a constant value L, and initial $X_0$ and $Y_0$ values from the calibration operation described below, and calculates the controller position in terms of the X, Y and Z coordinates based on triangulation principles. In one embodiment, the logic may be realized by a general purpose processor or graphics processing unit, and associated memory resources as is well-known in the art.

Figure 4A:
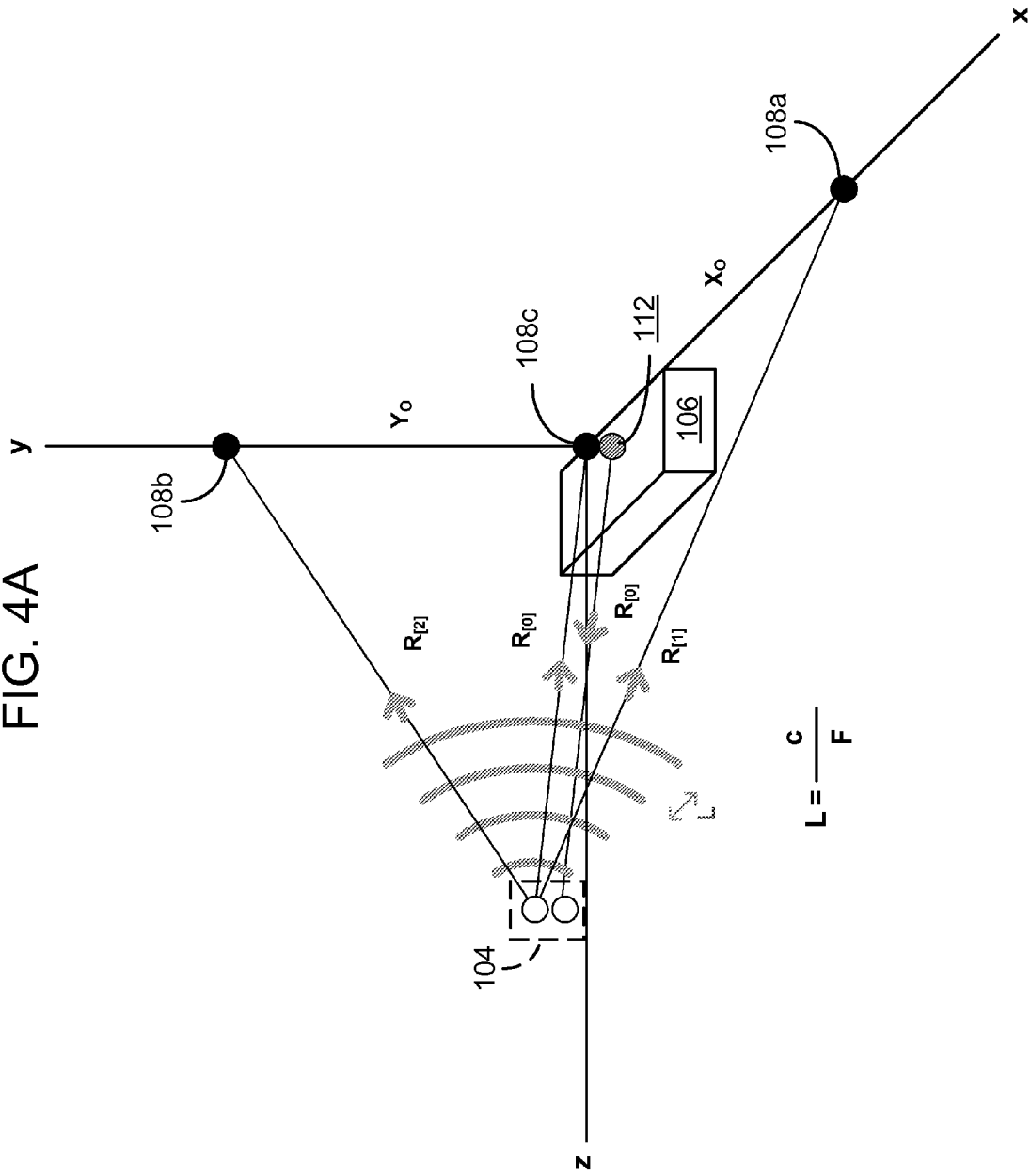
FIG. 4A illustrates an arbitrary geometrical layout of the tracking system of FIG. 1 in Cartesian coordinates during typical operation.

Referring now to FIG. 4A, the geometry of a generic tracking system configuration is shown with the respective X and Y sensor circuits 108a and 108b positioned in a spaced-apart non-collinear relationship with the console unit 106. In one embodiment, the third "Z" sensor 108c is co-located with the console unit 106, and defines the origin reference point. This allows the reference signal transmitter circuit 114 and the sensor [c] receiver circuit 132 to share the same antenna element. Other embodiments may separate the transmitter and the sensor [c] receiver by some distance. In one embodiment, the spaced-apart sensors may be configured for securing along a wall or other framework and adapted to interface with the console via the fixed-length cables 110a-110c. Each cable length defines respective coordinate paths such as $X_0$ and $Y_0$, and dictates the achievable angular resolution. Longer paths provide more angular resolution, which is desirable from a positional accuracy perspective. During operation, the reference signal source 112 and the reference sensor 108c communicate with the controller device 104 along a wireless link or path having a length $R_{[0]}$. Similarly, the remaining sensors 108a and 108c communicate with the controller 104 via wireless paths $R_{[1]}$ and $R_{[2]}$. Although the sensors are illustrated in FIG. 4A as being at right angles to one another, any noncolinear arbitrary arrangement between the sensors may be employed. Variations in configurations, however, will have correspondingly varying initialization or calibration operations.

With the system framework set out in one embodiment as illustrated in FIG. 4A, the path lengths for each path segment $R_{[0]}$, $R_{[1]}$ and $R_{[2]}$ may be expressed in terms of the phase difference ($\Delta PH_{[0]}$–$\Delta PH_{[2]}$) between the reference signal REF1 transmitted along the fixed cable paths 120a-120c, and the retransmitted wireless reference signal(s) REF2' transmitted along the respective wireless paths $R_{[0]}$, $R_{[1]}$ and $R_{[2]}$ as follows:

$$R_{[0]} = \Delta PH_{[0]} * L * (0.5)$$

$$R_{[1]} = [\Delta PH_{[1]} * L] + X0 - R_{[0]}$$

$$R_{[2]} = [\Delta PH_{[2]} * L] + Y0 - R_{[0]}$$

where L is the signal wavelength.

While the above expressions represent the signal paths in terms of phase differences, each path may also be expressed in terms of X, Y, and Z coordinates consistent with basic Euclidean geometric theory as follows:

$$R_{[0]}^2 = X^2 + Y^2 + Z^2$$

$$R_{[1]}^2 = [X - X_0]^2 + Y^2 + Z^2$$

$$R_{[2]}^2 = X^2 + [Y - Y_0]^2 + Z^2$$

Substituting for the values of $R_{[0]}$, $R_{[0]}$, and $R_{[0]}$, the following expressions for determining the target device position in terms of X, Y and Z may be obtained:

$$X = (R_{[0]}^2 - R_{[1]}^2 + X_0^2)/(2*X_0)$$

$$Y = (R_{[0]}^2 - R_{[2]}^2 + Y_0^2)/(2*Y_0)$$

$$Z = \sqrt{R_{[0]}^2 - X^2 - Y^2}$$

In one embodiment, the hardware described above to track the target device position provides at least 1 mm of spatial resolution, which corresponds to approximately 3 ps of time resolution. Assuming the maximum target device movement speed is on the order of 10 m/s, with 1 mm spatial resolution, the number of calculation updates to appropriately track the target device position is approximately $10^4$ updates/second. This is a very modest computation overhead, since each update only involves approximately 30 multiplication operations to convert $\Delta PH[a]$, $\Delta PH[b]$, $\Delta PH[c]$ into XYZ.

Further, in order to achieve appropriate coverage within a given linear dimension around the console, such as 10 meters with 1 mm resolution, a binary word size of 16 bits is sufficient. A more standard width of 32 bits provides 1 micron precision with a linear dimension of up to one kilometer; i.e. far more resolution than is actually needed in most applications.

The system hardware described above provides one specific way to carry out the following high-level operations and constraints: First, a phase with a fixed relationship relative to the reference signal REF1 in the console 106 is maintained at several points in the system (i.e. at the target device 104 with a PLL or equivalent which is periodically locked with a transmitted signal, at the sensor with a DLL or equivalent which is coupled via a cable to the reference signal). Further, the phase relationships represent the fractional part of a cycle of delay in the total propagation delay experienced by signals moving between the different parts of the system. The integer portion of the total propagation delay is determined by one of several initialization methods described below. Additionally, once the integer portion has been determined, the total propagation path (integer+fraction) may change freely as long as a periodic mechanism is used to update the fractional phase value (with carry/borrow into the integer phase value). This periodic mechanism must be frequent enough so that the fractional update precision is less than approximately a third of a cycle. In practice it will be considerably smaller than this to provide positional accuracy.

Although discussed briefly above, operation of the tracking system proceeds in accordance with steps shown in FIG. 4B. At step 402, the console reference signal source 112 generates the reference signal REF1 at a given frequency to serve as both a wired and wireless reference signal for subsequent phase comparisons. The antenna interface 114 processes the signal REF1 in a manner sufficient to generate a wireless reference signal REF2, at step 404. The reference signal is fed to the fixed signal paths 120a-120c as the fixed reference signal REF1, and simultaneously transmitted along the wireless path $R_0$ as the wireless reference signal REF2 by the antenna interface 114 as a continuous-wave, non-directional radio signal, at step 406. At this point, one form of the reference signal REF1 propagates along the fixed paths 120a-120c while another form REF2 propagates along the wireless path $R_0$, both originating from the same point source at a time t0.

At a second timing instant t1, the controller antenna interface 128 receives the wireless reference signal REF2 and retransmits the signal along wireless path R1 as reference signal REF2', at step 408. During this time, the wired reference signal REF1 continues propagating along the fixed paths 120a-120c and is distributed to the three sensor circuits 108a-108c, corresponding to the respective X, Y and Z coordinate axes. At a time t2, the wired reference signal REF1 is received, at step 410, as a first input to the phase comparison circuit 126 associated with the sensor circuit. At a time t3, the retransmitted wireless reference signal REF2' is received by the three sensor circuits 108a-108c, at step 412, and fed as a second input to each of the three phase comparison circuits 126. The two reference signals REF1 and REF2' are then compared to determine the relative phase difference, at step 414. The phase difference represents the difference in time-of-flight delays between the reference signal REF1 propagating along the fixed path 120a, 120b or 120c, and the combined wireless reference signals REF2 and REF2' propagating along the two wireless paths $R_0$ and $R_1$.

The phase comparison circuitry 126 for each sensor continually accumulates the phase difference between the reference signals REF1 and REF2', at step 416, in terms of full integer wavelength values and fractional wavelength values. The integer wavelength values are based on the known fixed path lengths $X_0$, $Y_0$ and $Z_0$, and the known frequency of the wired reference signal REF1. In one embodiment, an initial assumption is also made that the difference in phase between the wired reference signal REF1 and the wireless reference signal REF2' does not exceed one wavelength. During subsequent monitoring, overflowing the fractional phase difference value increases the integer wavelength count value.

Monitoring of the fractional phase difference between the wired and wireless reference signals REF1 and REF2' is carried out by detecting the respective signal phases at the phase comparator 202, and feeding a value based on the phase difference to the finite state machine 212. The finite state machine is programmed to determine the received value, and generate one from a selection of control signals depending on the value of the phase difference. The counter 214 responds to the received control signal by incrementing or decrementing the fractional phase delay value in the phase register 210. Changes in the integer wavelength count and fractional wavelength count are fed to the console, at step 418, along the respective integer and fractional paths 216 and 218. Once the data from the three sensor circuits is received, the target device position may be calculated by employing the triangulation relationships described earlier, at step 420.

As the changes to the integer and fractional wavelength values are received at the console 106, the subtraction circuit 306 applies calibrated baseline values to compensate for any known non-zero values determined during calibration. One embodiment of the calibration process is described below.

Figure 5:
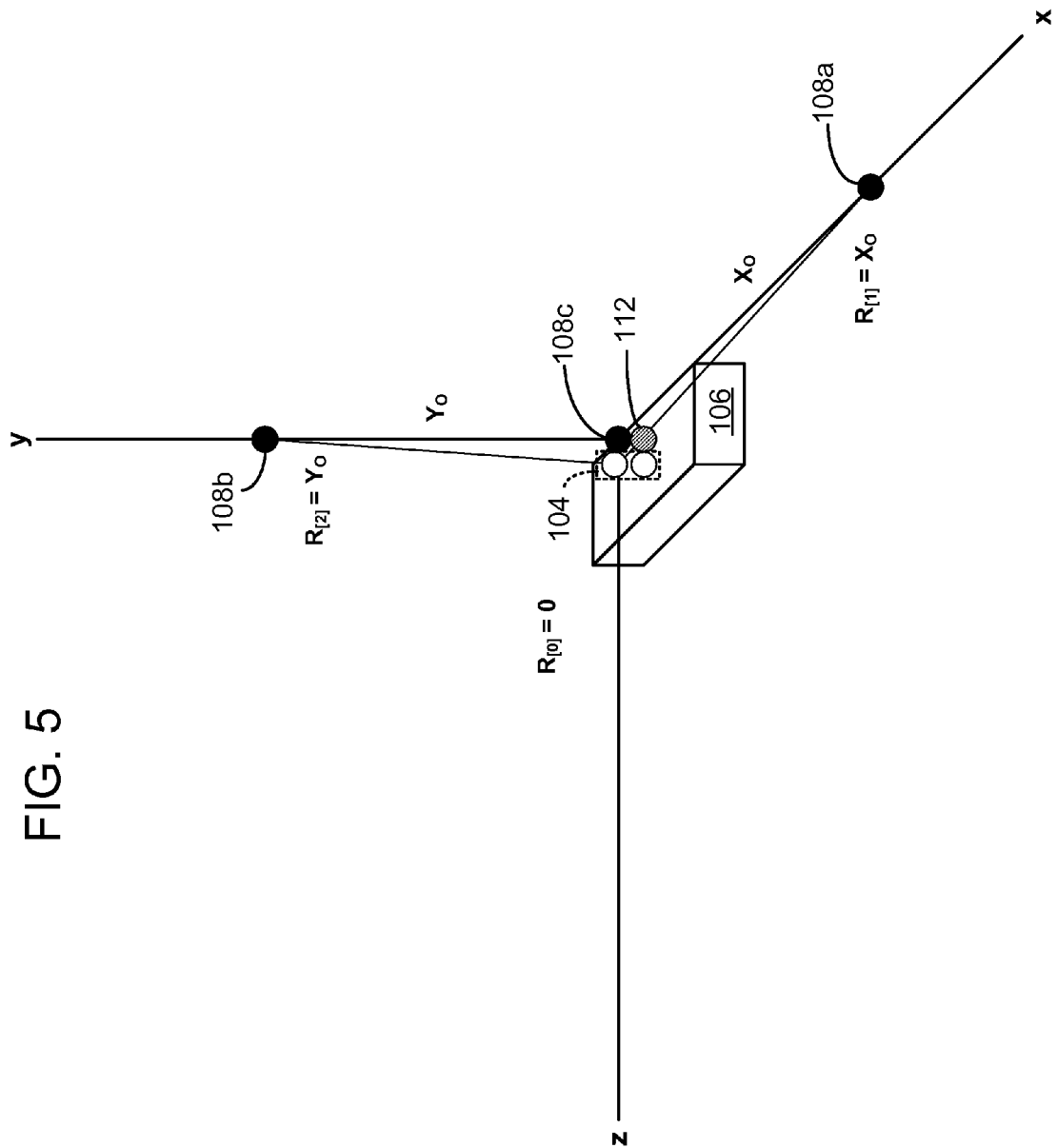
FIG. 5 illustrates a simplified geometric layout of the tracking system of FIG. 1 in Cartesian coordinates to effect an initial calibration of the system.

The initialization, or calibration operation generally sets baseline reference position values prior to operation. In some embodiments, the initialization operation determines the number of integer wavelength values to start with in the phase register. Once the reference position is determined and set by the console 106, any offsets from the initial position detected by the console may be relied upon as the true position. FIG. 5 illustrates one embodiment of the system geometry that may be employed for the calibration operation to "zero out" the X, Y, and Z coordinates with respect to the console location. Generally, the operation involves placing the target device 104 on or adjacent the console 106, and briefly operating the system such that the zero reference point corresponds to the console position. This "mechanical" initialization method takes advantage of the hardware shown in FIG. 3, specifically the initialization register 304 which stores the current integer and fractional phase totals.

With the target device 104 positioned on the console 106 in a fixed position such that the phase difference values $\Delta PH_{[0]}$–$\Delta PH_{[2]}$ are zero, the position equations reduce to:

$$R_{[0]}=0$$

$$R_{[1]}=X_0$$

$$R_{[2]}=Y_0$$

Similarly, the expressions in terms of X, Y, and Z coordinates may be shown as:

$$R_{[0]}^2=0$$

$$R_{[1]}^2=[X_0]^2$$

$$R_{[2]}^2=[Y_0]^2$$

Substituting for the values of $R_{[0]}$, $R_{[1]}$, and $R_{[2]}$, the following expressions for determining the calibrated "reference" target device position in terms of X, Y and Z may be obtained:

$$X=(0)/(2*X_0)$$

$$Y=(0)/(2*Y_0)$$

$$Z=\sqrt{Q-Q-Q}$$

As noted briefly above, although the embodiments described in this disclosure focus on wireless methods using electromagnetic waves in the radio-frequency range, other ranges could also be used (optical or infrared, for example). Also, acoustic waves propagating through the air or through water (in the sonic or ultra-sonic frequency ranges) could be employed consistent with the principles described herein. Finally, any of these alternatives could be combined in hybrid methods; for example using an RF signal from the console to the target device and an acoustic signal from the target device to the sensor.

Figure 6:
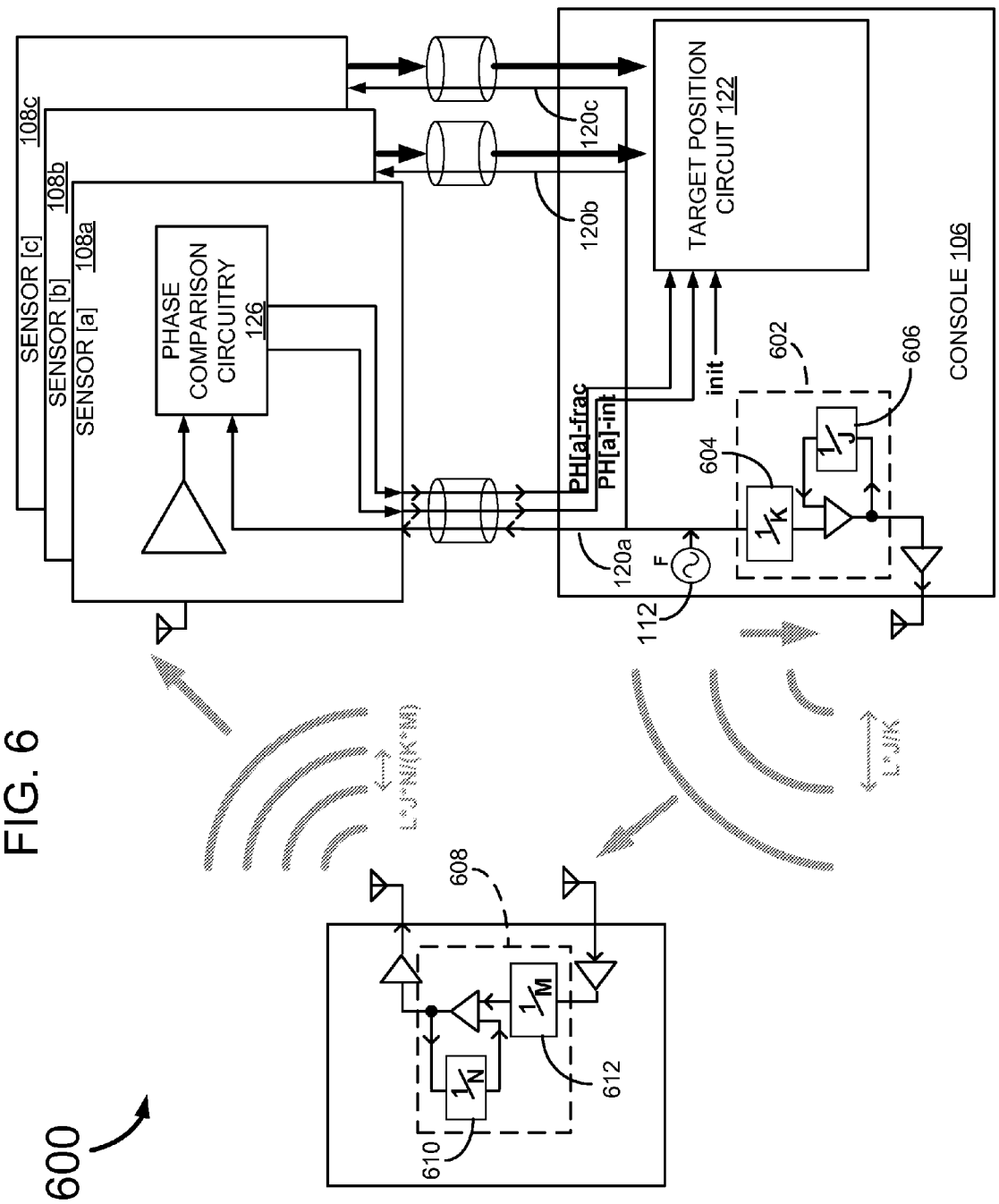
FIG. 6 illustrates a further embodiment of a tracking system similar to that shown in FIG. 1, and employing adjustable frequencies.

FIG. 6 illustrates a further embodiment of a wireless device tracking system 600 similar to that described above, and employing adjustable frequency reference signal generators at the console 106 and target device 104. Much of the structure is similar to that described in FIGS. 1-3 above, with the inclusion of phase-locked-loop (PLL) circuits 602, 608 and 702 in the console, target device(s) and sensor circuits, respectively. This provides a convenient way to utilize multiple target devices during, for example, video game play, and provide the flexibility to generate and transmit reference signals at different frequencies while maintaining a synchronous environment between the console, target device(s) and sensor circuits.

Further referring to FIG. 6, one embodiment of the console 106 provides a controller position circuit 122 similar to that of FIGS. 1 and 2. In one embodiment, the console PLL circuit 602 includes respective divider circuits 604 and 606 to divide a reference signal REF1 having a frequency $F_{REF0}$ determined by preselected divisor values K and J. The divider circuits 604 and 606 are disposed in corresponding reference and feedback paths such that the PLL output signal REF1' exhibits a frequency $F_{REF1}$ that is proportional to the integer ratio of the divisor values J and K. In one embodiment, the console 106 also includes multiple copies of the controller position circuitry corresponding to the number of supported target devices.

With continued reference to FIG. 6, the controller PLL circuit 608 is similar to the console PLL circuit 602, with respective divider circuits 610 and 612 associated with respective divisor values N[g] and M[g]. By setting the values of N and M, a retransmitted reference signal REF2' having a unique signal frequency F[g] may be generated for the target device 104[g] that remains mesochronous with the transmitted reference signal REF1. Multiple target devices 104[g], 104[g+1] are thus able to generate respective signal retransmissions with different frequencies, and thus uniquely identifiable.

Figure 7:
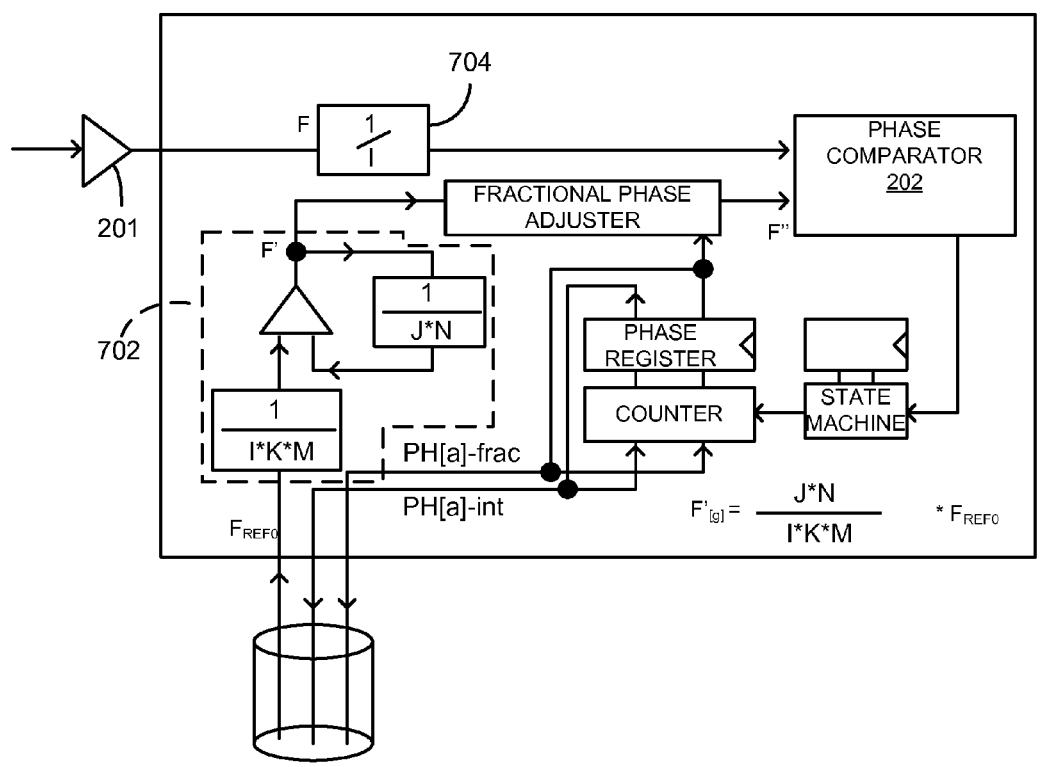
FIG. 7 illustrates a block diagram of one embodiment of a sensor circuit within the tracking electronic device of FIG. 6.

The sensor circuitry 108a-108c also employs PLL circuitry in a manner similar to that described for the console 106 and target device 104. FIG. 7 illustrates further detail for one sensor circuit, with much of the structure being similar to the sensor circuit described in FIG. 2. At the receiver 201, a divider circuit 704 is employed to divide the received wireless reference waveform REF2' from a particular target device 104[g] by a programmable value "I", for feeding as one input to the phase comparator 202. The PLL circuit 702 also divides the frequency of the fixed reference signal REF1 by the same "I" value, and also modifies the fixed reference signal frequency by the target device and console ratios J/K and M/N. In one embodiment, with the inclusion of multiple target devices, each sensor circuit employs multiple copies of the fractional phase circuitry 206 corresponding to the number of supported target devices to detect the positions of the multiple target devices.

Figure 8:
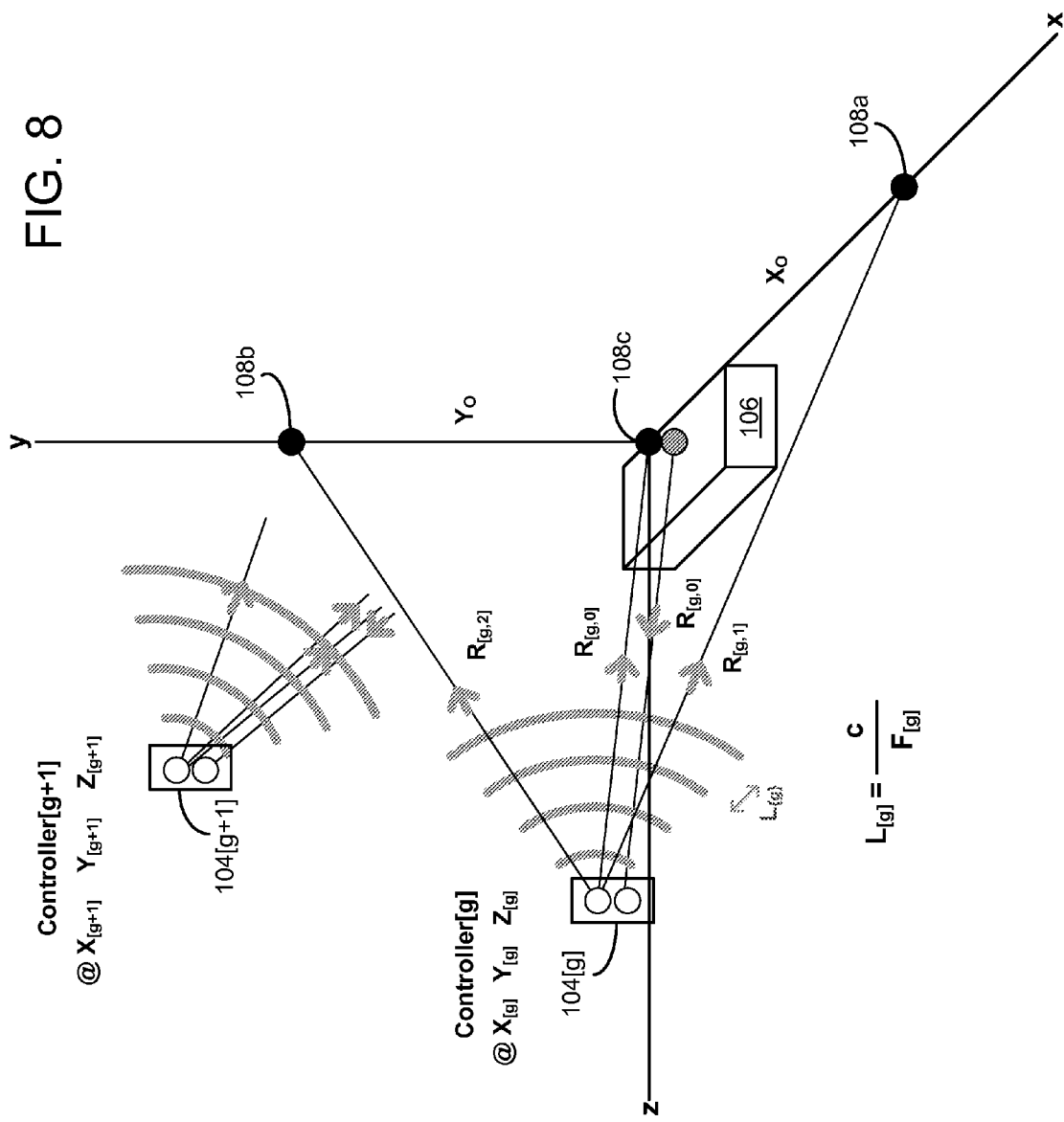
FIG. 8 illustrates an arbitrary geometrical layout of the tracking system of FIG. 6 in Cartesian coordinates during typical operation with multiple controllers.

FIG. 8 illustrates a multi-target system setup that takes advantage of the flexible frequency signal generation described above. Sensor circuits 108a-108c are configured in a non-collinear manner, and target devices 104[g] and 104[g+1] are disposed in different positions in three-dimensional space. With the console 106 serving as the reference location, the position locations for each target device may be expressed by equations identical to those already identified above.

Figure 9:
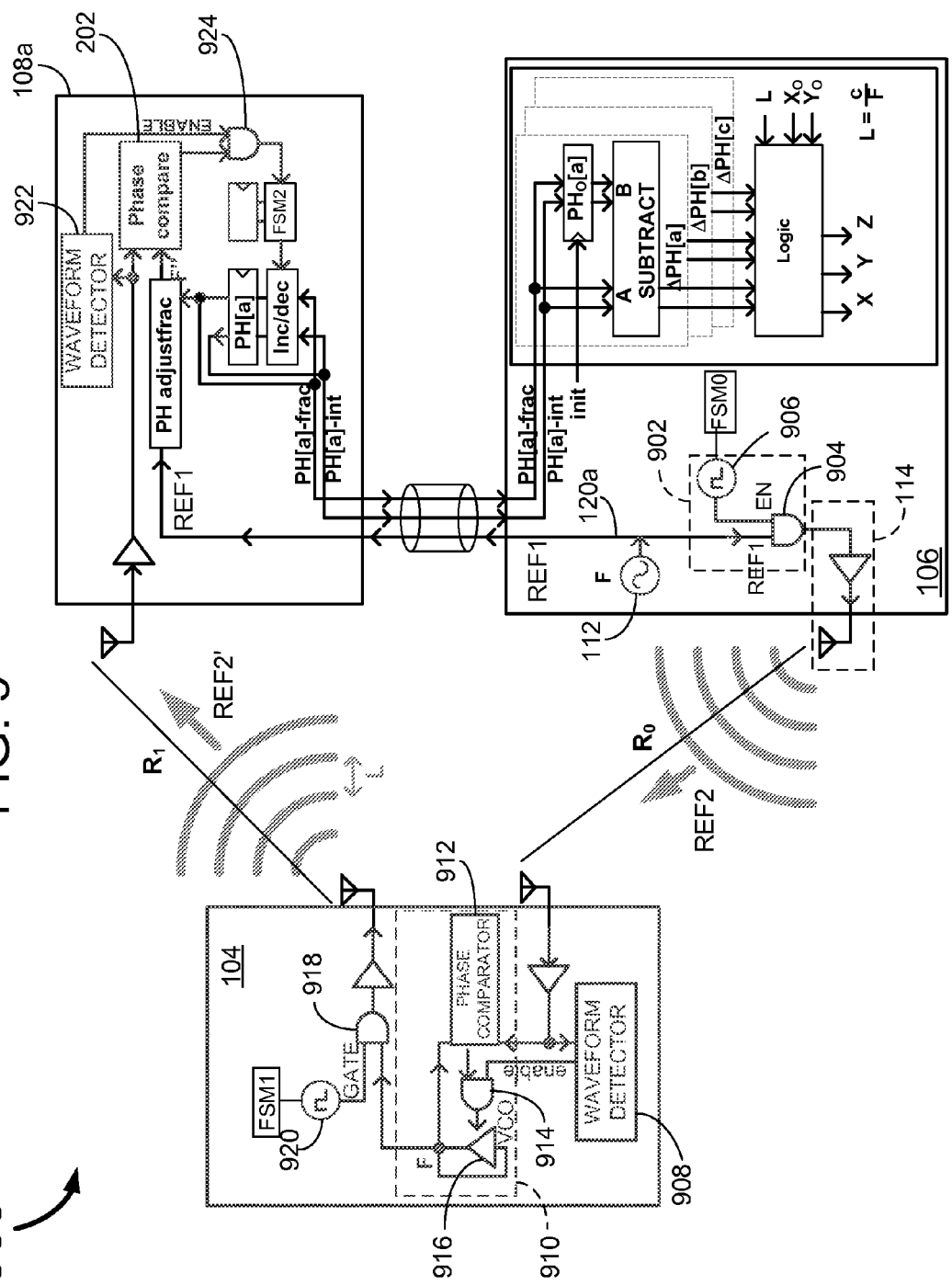
FIG. 9 illustrates a further embodiment of a tracking system similar to that shown in FIGS. 1 and 6, and employing circuitry to reduce reflection interference.

FIG. 9 illustrates a further embodiment of a wireless tracking system 900 similar to the embodiments described previously, and including provisions for handling signal interference issues during operation and multiple target devices. At a high-level, this is accomplished by slicing up a single signaling frequency into intervals of time according to a coordinated schedule. As in the previous embodiments, at least three sensor circuits 108a-108c are employed to communicate with a console unit 106 via wired connections 120a-120c (for clarity purposes, only sensor 108a and path 120a are shown). A reference signal source 112 generates a reference signal REF1, which is fed to the sensor circuits via the connections. A target device 104 wirelessly receives a reference signal REF2 from the console and retransmits the reference signal as REF2'. The retransmitted reference signal REF2' is compared to the wired reference signal REF1 transmitted by the console 106. However, to minimize interference from reflections, in one embodiment the reference signals REF1 and REF2' are gated in a manner that controls the duration of the timing interval associated with each signal. In this manner, versions of the reference signal that are detected outside of the valid timing interval are discarded or ignored.

Further referring to FIG. 9, to carry out the gating functionality, the console 106 employs gating logic 902 that in one embodiment, includes a gate element 904 with respective inputs to receive the reference signal REF1, and an enable signal EN from a gating signal source 906. The gating signal source is responsive to a state machine FSM0 to allow a burst of cycles to be transmitted. The gating logic 902 feeds the windowed reference signal REF1 to an antenna interface circuit 114 only when the enable signal EN is valid.

The target device 104 incorporates a waveform detector 908 that cooperates with gating circuitry 910 to detect reference signal bursts REF2 from the console 106, and retransmit corresponding signal bursts REF2' to the sensor circuits 108a-108c. The gating circuitry 910 includes a PLL circuit including a phase comparator 912 that receives the reference burst signal REF2 from the console 106, and feeds it to one input of a gate element 914. The gate element also receives an enable signal generated by the waveform detector 908 upon detection of the console reference signal burst REF2. Detection of the signal bursts also alerts a controller state machine FSM1 to perform a phase comparison so that the local clock generated by a voltage-controlled-oscillator (VCO) 916 can be relocked to the received signal. The VCO receives the output of the gate element 914 and feeds it to a subsequent gate element 918. The subsequent gate element is responsive to a further enable signal GATE from a second gating circuit 920 before retransmitting the reference signal burst REF2' to the sensor circuits. The phase comparator 912 also receives the output of the VCO as feedback to allow it to phase lock to the incoming reference burst signal REF2.

Each sensor circuit 108 exhibits the structure illustrated in the embodiment corresponding to FIG. 2, and in one embodiment, also includes additional circuitry to cooperate with the gating functionality of the console 106 and the target device 104. In one embodiment, the additional circuitry takes the form of a waveform detector 922 that generates an enable signal ENABLE upon detection of a received retransmitted reference burst signal REF2' from the target device 104. The enable signal ENABLE is fed to a gate element 924 which controls whether or not signals from the phase comparator 202 are fed to a state machine FSM2. Tracking the integer and fractional phase difference values occurs similarly to the previous embodiments, although governed by the additional gating circuitry.

Figure 10:
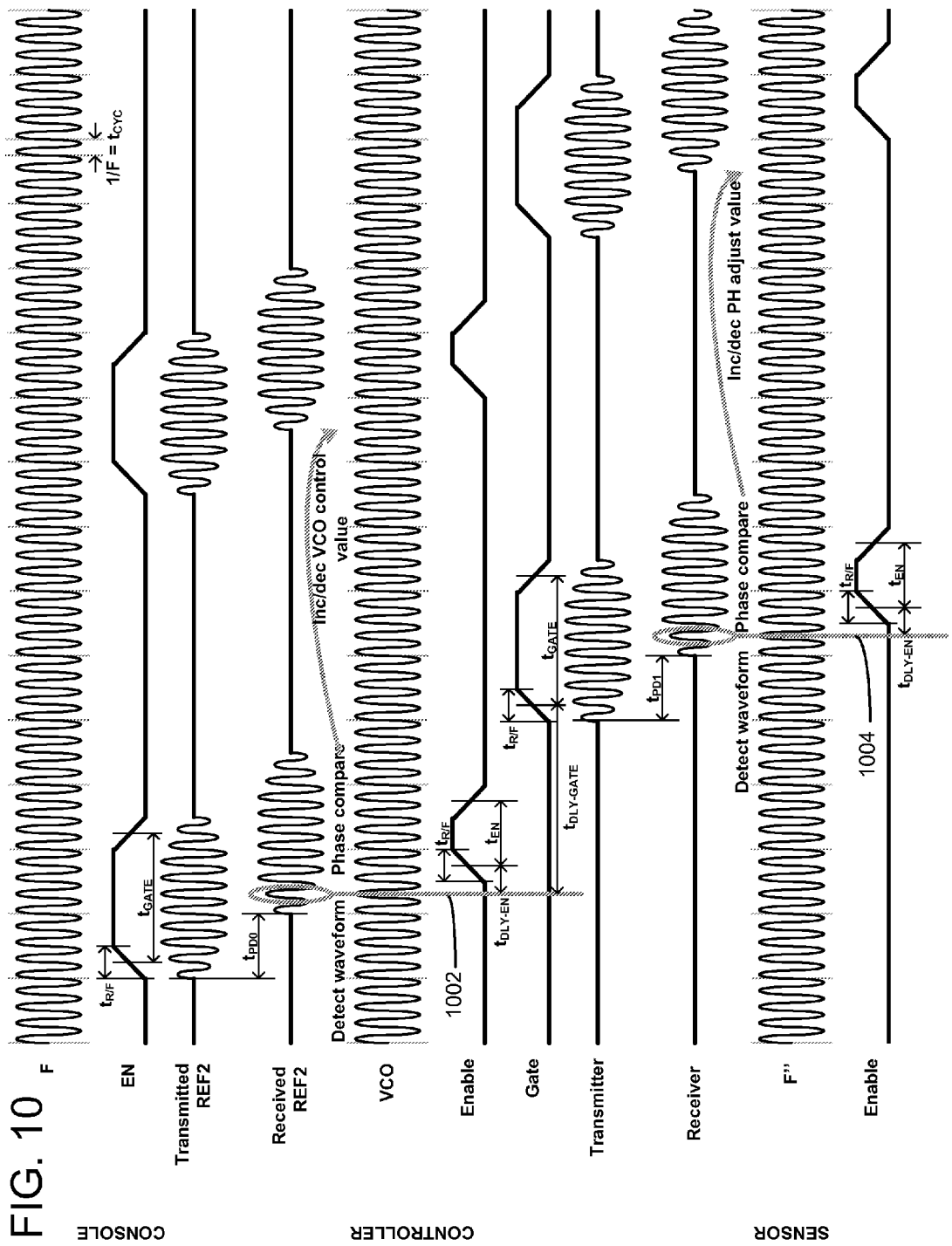
FIG. 10 illustrates the signaling and timing during operation of select portions of the tracking system of FIG. 9.

FIG. 10 illustrates representative waveforms and timing associated with operation of the tracking system shown in FIG. 9. The console, target device, and sensor(s) each have a free-running clock, represented by the waveforms labeled F, VCO and F''. These clocks have a fixed phase relationship that is determined by the position of the target device. Beginning at a time t0, the gating or enable signal EN from the gating signal source 906 gates the reference clock F for an interval $t_{GATE}$. The rise and fall time of the cycle burst is not critical, since the burst will be used at a point when it has become stable. The cycle burst requires a time $t_{PD0}$ to propagate to the target device. The waveform detector triggers a phase compare, which updates the control value used by the VCO. This phase compare is caused by asserting the enable signal "Enable" after a delay $t_{DLY}$-$t_{EN}$. This time is dependent upon the received signal becoming stable. The waveform detector also triggers a second transmission by asserting the enable signal "Gate" for a time $t_{DLY}$-$t_{GATE}$. This time is dependent upon reflections (from the first burst transmission) attenuating to a level that does not create interference. The second cycle burst requires a time $t_{PD1}$ to propagate to the sensor. The sensor waveform detector 922 triggers a phase compare, which updates the control value used by the phase delay element. This phase compare is caused by asserting the enable signal "Enable" after a delay $t_{DLY}$-$t_{EN}$. This time is dependent upon the received signal becoming stable.

By gating the wireless signal transmissions and receptions, reflected waveforms from remote walls and surfaces may be straightforwardly ignored. Such reflections often create interference with newly received signals, possibly degrading signal integrity and system performance.

Figure 11:
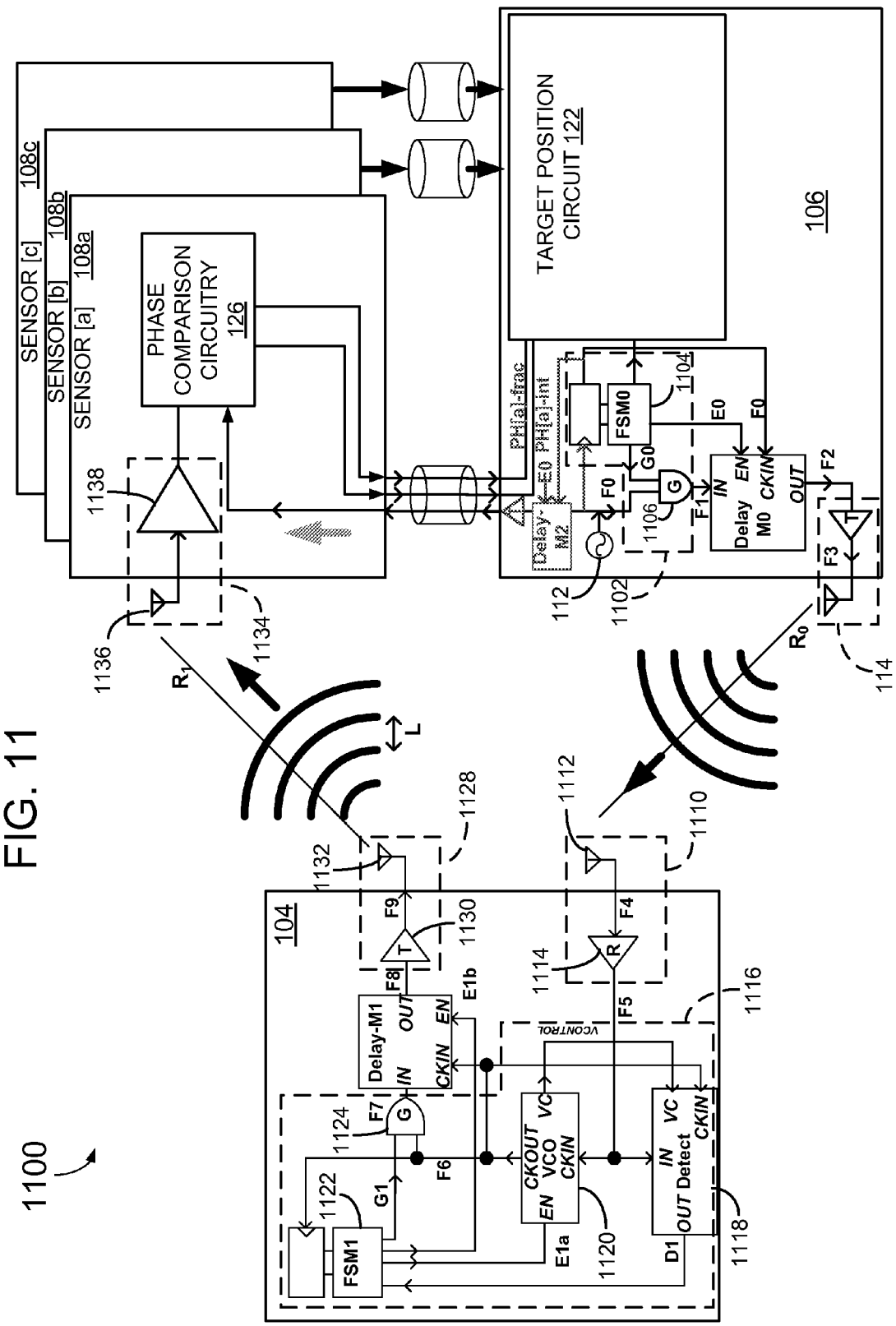
FIG. 11 illustrates a further embodiment of a tracking system similar to that shown in FIGS. 1, 6, 9, and employing circuitry to compensate for timing drift.

FIG. 11 illustrates further detail associated with the tracking system of FIG. 9 that incorporates features to address timing drift during normal operation resulting from, for example, typical PVT effects on integrated circuits. These effects, resulting from process, voltage or temperature changes, can undesirably alter system settings and thus affect the accuracy of the position detection capability during operation. By providing delay compensation throughout the tracking system, timing problems due to drift may be minimized.

At a high-level, the tracking system, generally designated 1100, includes a console 106, a movable target device 104, and three sensors 108a, 108b, and 108c. Each of these blocks is controlled by a state machine FSM0, FSM1, and FSM2. The state machines are clocked by local reference signals (not shown), which are each ultimately sourced by the reference signal source 112. Like the previously described embodiments, this is a mesochronous system, meaning each part of the system maintains a known phase relationship with the other parts. The phase relationship changes with the movement of the target device 104, and these phase changes may be used to derive the position of the target device 104.

Further referring to FIG. 11, one embodiment of the console unit 106 includes a reference signal source 112, a controller position circuit 122, gating logic 1102, compensation circuitry 1108, and a wireless transmit circuit 114. Various nodes in the system are labeled to provide a reference to particular waveforms being discussed (such as F0-F15, E0, G0, etc.). For ease of reference, particular signals may be referred to by the node labeling. The reference signal source 112 is similar to those described in previous embodiments, providing a reference signal F0 having a preselected frequency. Likewise, the controller position circuit 122 is also configured similarly to that described earlier. To avoid reflection interference, the gating logic 1102 responds to the state machine FSM0 to generate an enable signal G0 for application to the input of gate element 1106 along with the reference signal F0. The reference signal F0 from 112 is thus gated by signal G0 from the state machine FSM0 1104. This allows a burst of cycles to be transmitted as signal F3 by the transmitter 114. The gating logic 1102 selectively enables windowed intervals of the reference signal F0 for eventual transmission as reference signal bursts F3 to the target device 104. The gating logic output is fed to the delay circuitry Delay-M0, which in one embodiment comprises a variable delay circuit described in further detail below. The wireless transmit circuitry 114 converts the output from the delay circuitry Delay-M0 into an RF signal for wireless transmission to the target device 104. The gating element 1106 and the transmit function 114 generally exhibit a circuit delay that can drift during system operation. The delay circuit Delay-M0 ensures that the total delay from F0 to F3 is an integral number of cycles of the reference signal F0.

With continued reference to FIG. 11, the target device 104 includes a receiver circuit 1110, a gating circuit 1116, delay circuitry Delay-M1 and transmit circuitry 1128. The receiver circuit 1110 employs an antenna interface 1112 to wirelessly receive the reference signal bursts F3 from the console transmitter 114 to become signals F4. The received signals F4 are fed to a receiver 1114 and output as waveforms F5, which are then directed to the gating circuit 1116. The gating circuit includes a waveform detector 1118 coupled to a VCO-based clocking circuit 1120. A finite state machine FSM1 and gate element 1124 cooperate with the waveform detector 1118 and clocking circuit 1120 to detect receiver output signals F5, and assert signal D1 to the state machine FSM1 in response to the detection. Sometime after detection, the state machine FSM1 asserts an enable signal E1a. This signal causes the VCO 1120 to phase-compare the received signal F5 with its internally generated clock signal F6 and adjust F6 to match the phase of the signal F5 more closely. The received signal F5 is active for only a short interval. The state machine FSM1 waits for the burst interval of the received signal F5 to finish, and then it asserts a gate signal G1. The reference signal F6 from the VCO 1120 is gated by the gating element 1124 which is responsive to a gate signal G1. This allows a burst of cycles to be transmitted as signal F9 by antenna 1132. The receiver 1114, the gating element 1124 and the transmitter 1130 exhibit a circuit delay that can drift during system operation. The delay circuitry Delay-M1 ensures that the total delay from when signal F4 is received to when signal F9 is transmitted is an integral number of cycles of the reference signal F6. The state machine FSM1 also periodically asserts the E1b enable signal which allows the delay circuitry Delay-M1 to perform a calibration.

Further referring to FIG. 11, the sensor circuits 108a-108c each include a receive circuit 1134 with an appropriate antenna interface 1136 and receiver 1138 to detect and process the wirelessly transmitted burst signals F9 from the target device 104. Phase comparison circuitry 126 is also provided for each sensor circuit to continuously track the phase differences between the wired reference signal corresponding to F0 and a form of the wireless reference signal F9 for each coordinate axis X, Y and Z.

Figure 12:
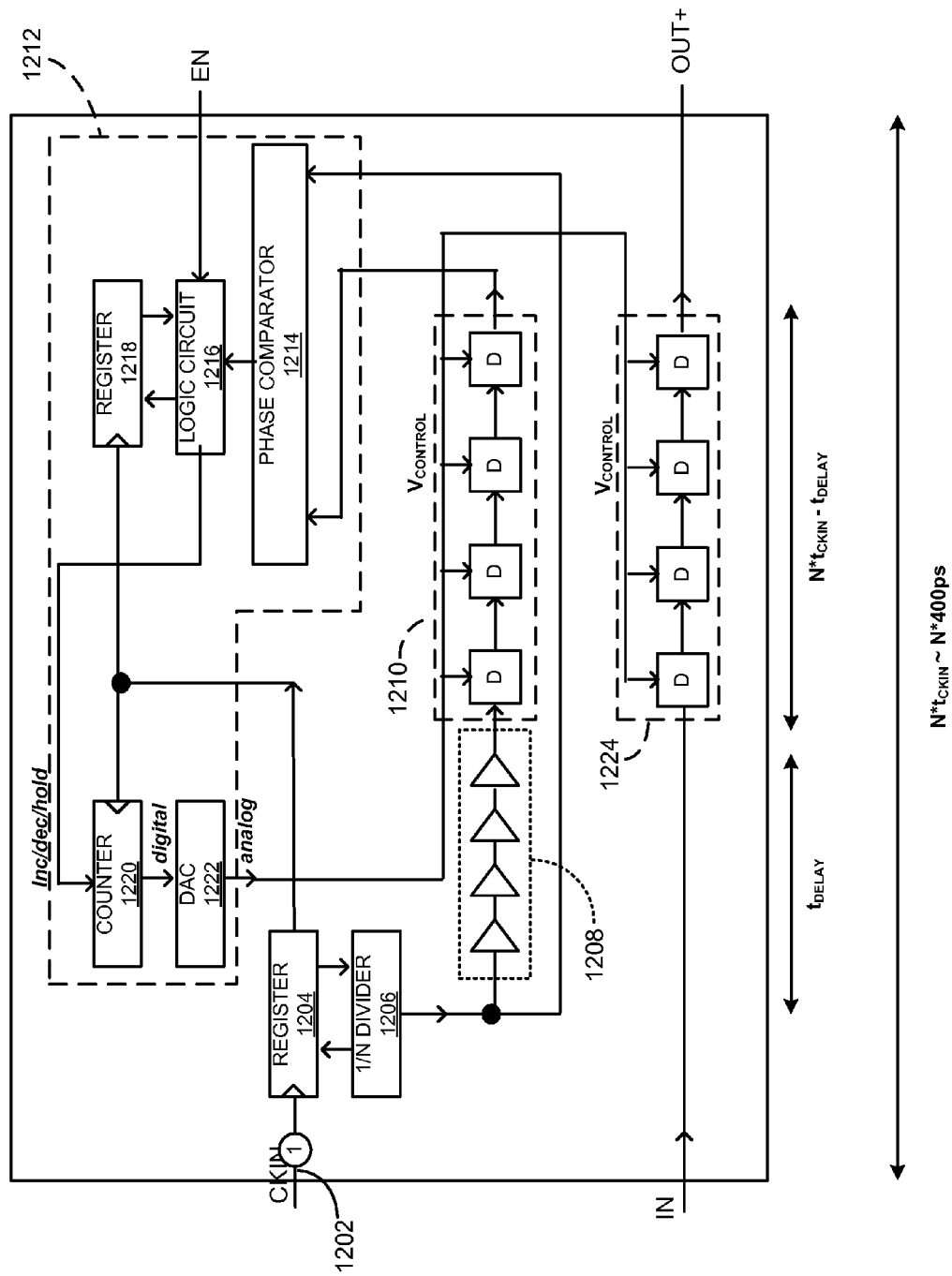
FIG. 12 illustrates one embodiment of a compensation circuit for use within the tracking and target devices of FIG. 11.

FIG. 12 illustrates further detail relating to the console delay circuit Delay-M0. The circuit includes a reference clock terminal 1202 to receive an intermittent reference clock CKIN. The reference clock is fed into a register 1204 and divided down in frequency by a programmable value N through divider circuit 1206. The divided clock then feeds a chain of replica circuits 1208 that duplicate the delay of the gating element 1106 and the transmitter 114 in the console 106.

With continued reference to FIG. 12, a further group of variable delay elements 1210 is disposed serially with the set of replica delay elements 1208. Each of the variable delay elements includes a control input to receive an analog control voltage $V_{control}$. The control voltage is generated by a control circuit 1212 that includes a phase comparator 1214. The phase comparator 1214 compares the divided frequency clock with the delayed divided frequency clock, and increments/decrements the digital value in a counter 1220 until they approximately match. The total delay through the chain of replica circuits 1208 and the chain of delay element circuits 1210 will be equal to one divided frequency clock cycle or N cycles of the reference clock CKIN. The delay circuit includes a second delay path 1224 between the IN and OUT signal ports, which includes only a chain of delay element circuits. This will be traversed by the F1 and F2 signals for the console delay circuit Delay-M0. Utilizing the delay circuit Delay-M0 in the console 106 enables the system to maintain the delay associated with signals at locations identified by nodes F0-F3 at a constant integer multiple of the reference signal period, or N*tck. As a result, changes in delays due to PVT drift are minimized.

In one embodiment, the compensation circuit 1126 employed by the target device 104 is configured similarly to the console compensation circuit 1108 described above, and maintains a constant delay along the delay path traversed by signals corresponding to waveforms at locations identified by nodes F4-F9. For the controller implementation, the replica circuits duplicate the delay of the receiver 1114, the gating element 1124, and the transmitter 1130. Additionally, the second delay path between the IN and OUT signal ports is used by the signals F7 and F8 in the controller 104.

Figure 13:
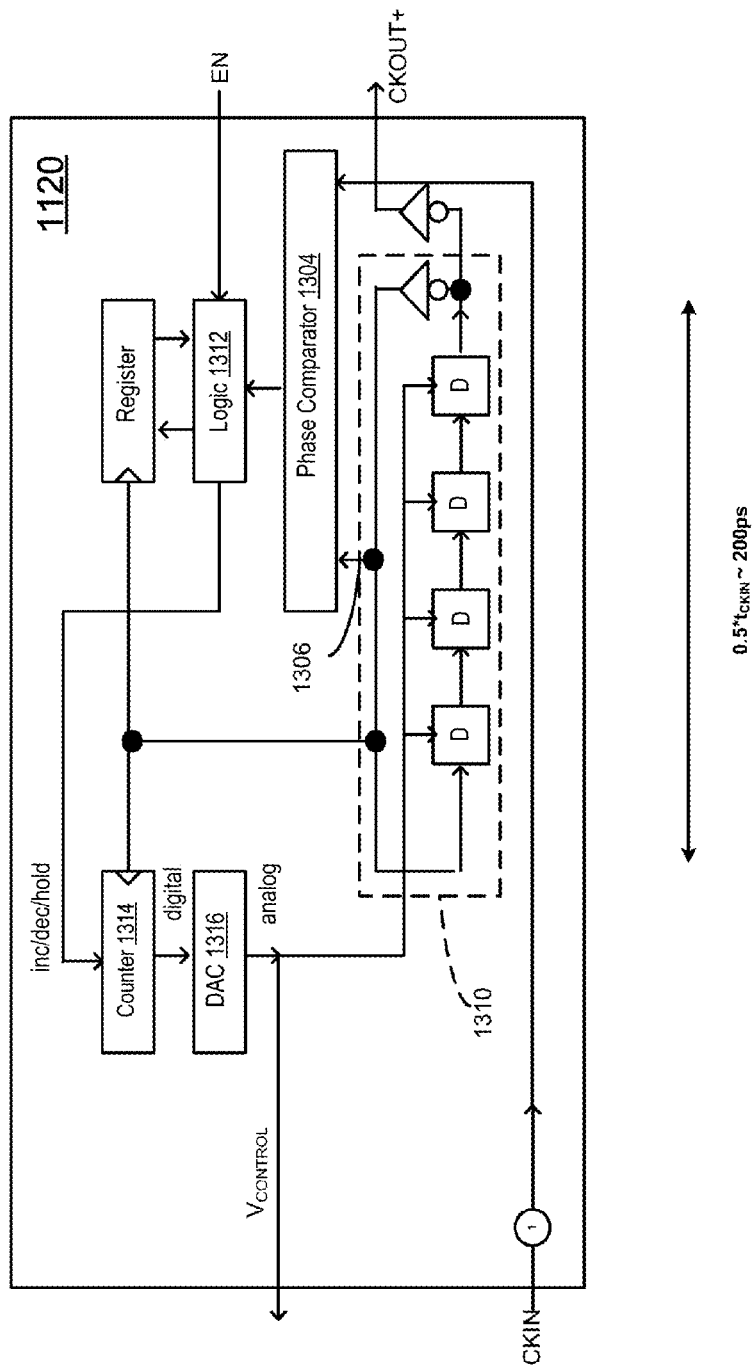
FIG. 13 illustrates a voltage controlled oscillator circuit within the target device of FIG. 11.

FIG. 13 illustrates the VCO-based clocking circuit 1120 in further detail. The circuit includes a chain 1310 of delay element circuits D. The delay elements D are connected in a ring configuration with an inversion, thus forming an oscillator. The oscillator generates a clock having an oscillation frequency that is set by a common analog control voltage $V_{CONTROL}$. This control voltage is different from the one used in the delay circuitry Delay-M0/Delay-M1 described above. The delay of each element D is adjusted by the control voltage, which is set by a digital value stored in a counter 1314. The digital value is converted to an analog value by a digital to analog converter (DAC) 1316. A phase comparator 1304 compares a reference clock CKIN with the oscillator clock, at 1306, and increments/decrements the digital value in counter 1314 until the phases of the clock signals approximately match. The total delay through the chain 1310 of delay element circuits D will be equal to ½ the cycle of the reference clock CKIN. Each delay element D will have a delay corresponding to ⅛ the cycle of the reference clock CKIN. The control voltage Vcontrol signal is passed to the controller waveform detector 1118 (FIG. 11), where it controls delay elements that allow the receiver signal F5 to be oversampled at 0, ¼, ½, and ¾ cycle intervals to detect the beginning of a cycle burst.

Figure 14:
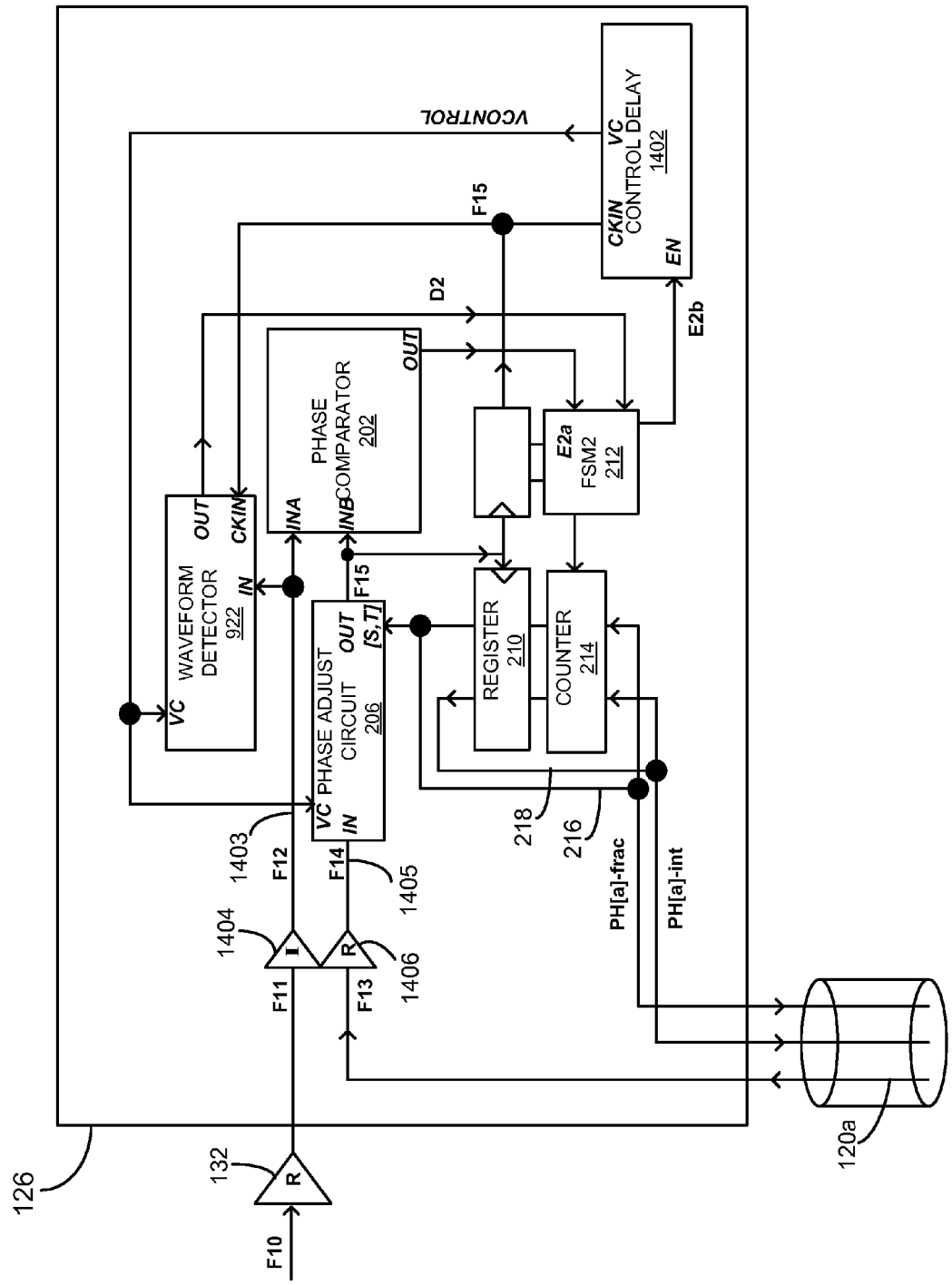
FIG. 14 illustrates a block diagram of one embodiment of a sensor circuit within the tracking device of FIG. 11.

FIG. 14 illustrates one embodiment of a representative phase comparison circuit 126 for use in each of the sensor circuits 108a-108c of FIG. 11. Similar to previously described embodiments, the phase comparison circuit 126 includes a phase adjust circuit 206 and a waveform detector 922. The phase comparison circuit 126 further includes a phase comparator 202 having respective inputs INA and INB to receive signals F12 and F15. As described in previous embodiments, the phase adjust circuit 206 responds to a phase difference register 210 that maintains the phase difference between signals F12 and F14 as a running count value. The finite state machine FSM2 and counter 214 detect the phase difference output from the phase compare circuit 202 and increment/decrement the register value in the phase register 210 accordingly. The fractional and integer values in terms of reference signal wavelengths are fed back to the console 106 continuously along paths 216 and 218. The finite state machine FSM2 also provides a control signal E2b fed as an enable signal to a control delay circuit 1402. The control delay circuit generates the control voltage $V_{control}$ that is distributed to the waveform detector 922 and the fractional phase adjust circuit 206.

Further referring to FIG. 14, the waveform detector 922 includes an input 1N to sense incoming signals from a wireless receive path 1403 so as to discriminate between spurious signals and reference signal burst transmissions. Thus, as the transmitted signal F9 from the target device 104 propagates along path R1 to become signal F10, at receiver 132, the received signal F11 is delayed by a replica delay circuit 1404 to become signal F12. Further details regarding the replica circuit will be described in connection with FIG. 18. A cycle burst corresponding to signal F12 is detected by the waveform detector 922, which asserts the D2 signal to the state machine FSM2.

The phase reference point defined by the reference signal F0 moves along a second path from the console along the connections 120a-120c. Starting at the reference signal source 112, signal F0 is delayed by $t_{M2}+t_T$, the delay associated with a delay circuit Delay-M2, and the transmitter T. The sum of these delays is constrained to be $Q*t_{CK}$ by the delay circuit Delay-M2. The delayed signal F13 at the sensor is delayed by a replica of the receiver 1406. The replica delay matches the delay associated with the sensor receiver 132. The signal F14 signal is delayed by the phase adjust circuit 206 to provide a delayed signal F15, which is fed to the phase comparator 202. The phase comparator compares the relative phase of signals F12 and F15 and generates an output signal E2a. Sometime after detection, the state machine FSM2 samples the E2a output signal. This signal indicates whether signal F15 needs more or less delay. In response, the counter logic 214 increments or decrements the phase value in the register 210. The low six bits of this register represents the fractional phase value PH-FRC, representing the delay generated by the phase adjust circuit 206. This delay is in increments of 1/64th of a reference signal cycle, ranging from 0/64 cycle to 63/64 cycle. Note that the counter logic 214 forces a carry or borrow from the lower fractional phase bits PH-FRC to the upper integer phase bits PH-INT.

Figure 15:
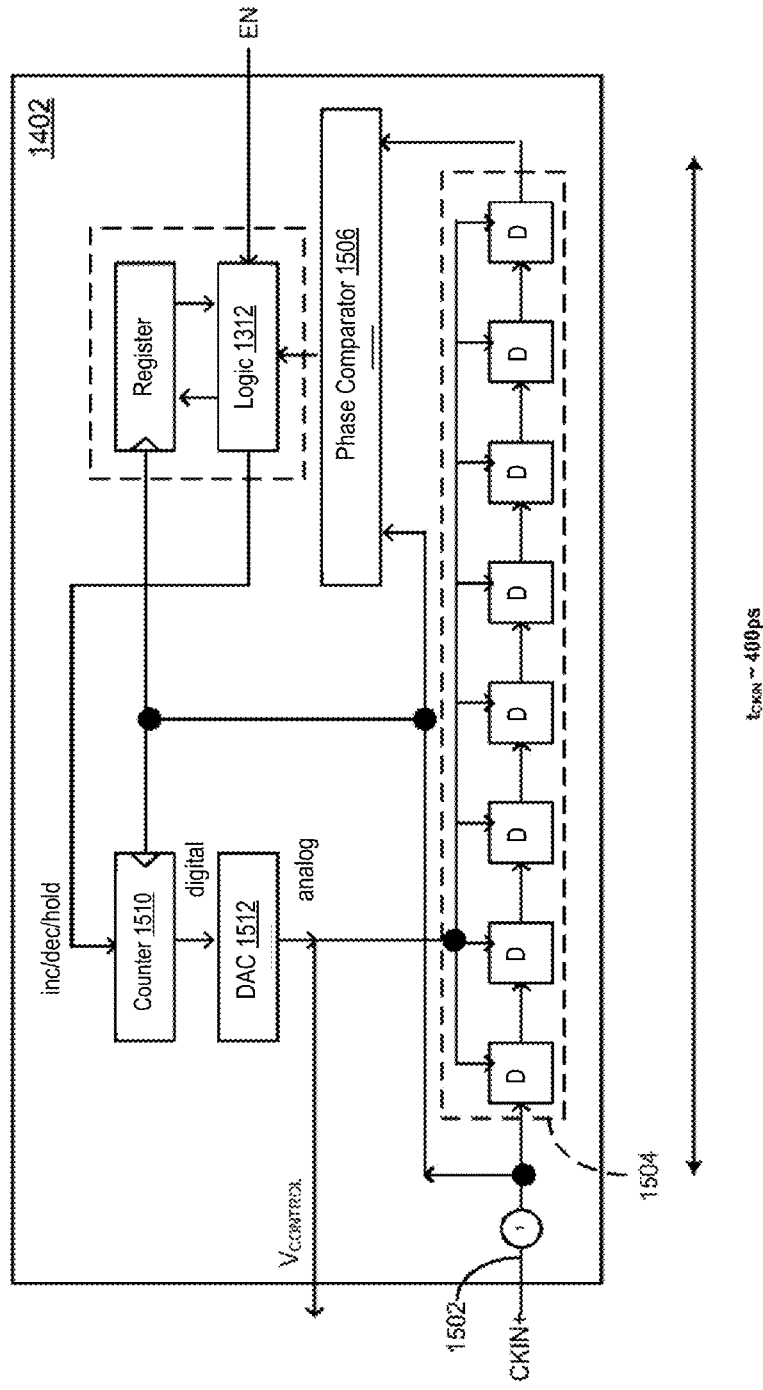
FIG. 15 illustrates one embodiment of the control delay circuit in the sensor circuit of FIG. 14.

FIG. 15 illustrates one embodiment of the control delay circuit 1402 shown in FIG. 14. The circuit is similar to the VCO circuit 1120 of FIG. 13 and generally serves to generate a control voltage $V_{control}$ for delay elements in the waveform detector 922. The circuit includes a clock input terminal 1502 to receive a clock signal CKIN that feeds a delay line of delay elements 1504 that are responsive to the control voltage $V_{control}$. The control voltage is set by a digital value generated by a counter 1510. A DAC 1512 converts the digital value to an analog value. A phase comparator 1506 compares the reference clock CKIN with the delay chain output and increments/decrements the digital value in counter 1510 until the signal phases approximately match. The total delay through the chain of delay element circuits 1504 will be equal to one cycle of the reference clock CKIN. Each delay element will have 1/8 cycle of the reference clock delay. The control voltage $V_{control}$ is passed to the waveform detector 922, where it controls delay elements that allow the signal F12 from the receiver 132 to be oversampled at 0, 1/4, 1/2, and 3/4 cycle intervals to detect the beginning of a cycle burst. The control voltage signal $V_{control}$ is thereupon distributed to the phase adjust circuits 206 in the sensor circuitry.

Figure 16A:
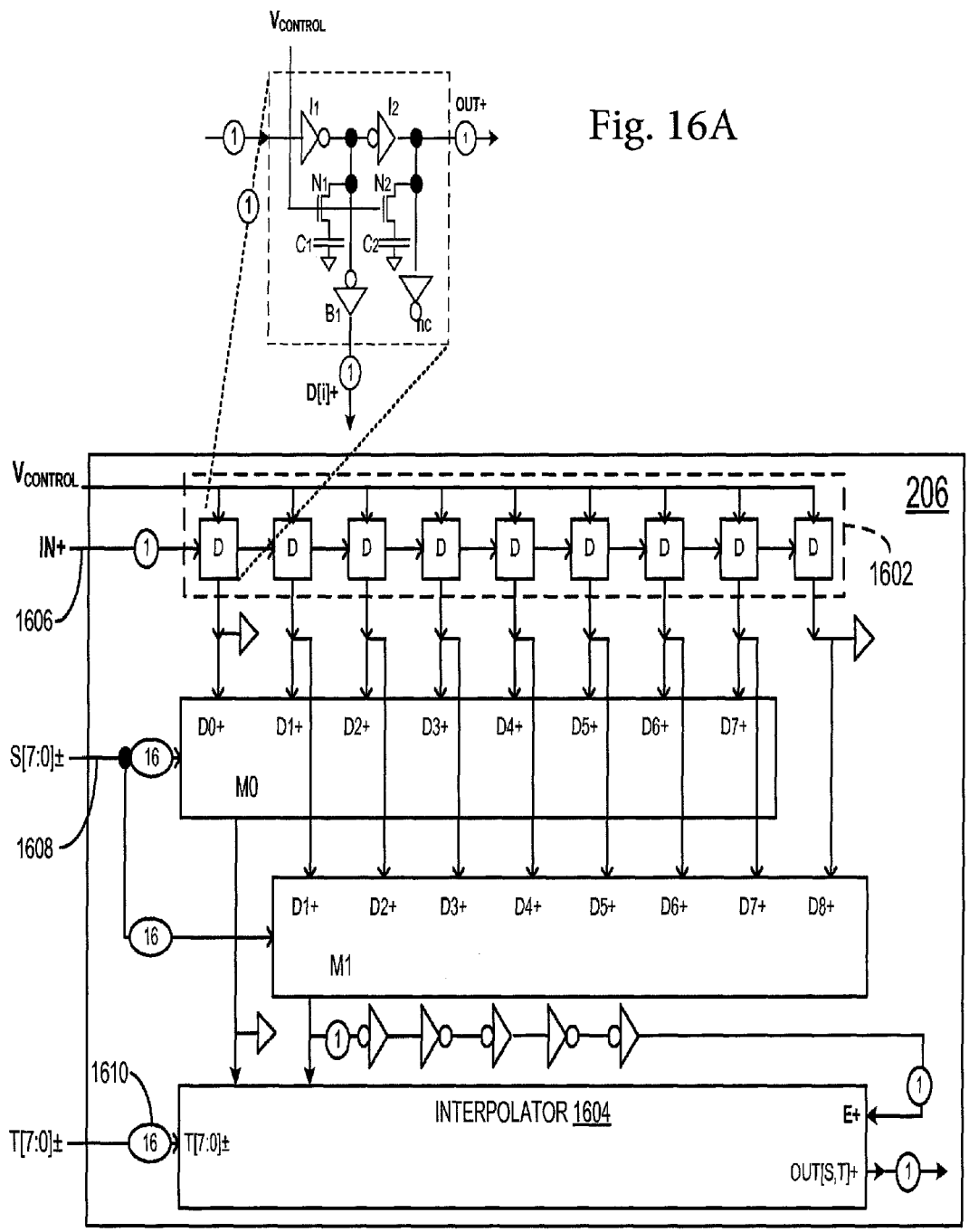
FIG. 16a illustrates a fractional phase delay circuit within the sensor circuit of FIG. 14.

FIG. 16a illustrates one embodiment of the fractional phase adjust circuit 206 shown in FIG. 14. The circuit employs an input delay line 1602 of delay elements D that are adjusted by a common analog control voltage $V_{control}$.

The control voltage $V_{control}$ is set by the control delay block 1402 (FIG. 14). Each delay element D has a delay corresponding to 1/8 cycle of the input clock CKIN. An input signal IN+ presented to an input terminal 1606 is given a coarse delay in increments of 1/8 cycle of CKIN. A control input interface 1608 receives control inputs S[7:0] to select a pair of adjacent coarse delays using the respective multiplexers M0 and M1. The coarse delay values are passed to an interpolator 1604. The interpolator includes a set of inputs 1610 to receive control signals T[7:0] that select a fine adjust value in increments of 1/64 cycle of the input clock CKIN. A register in the interpolator stores the fine adjust value. The low six bits of this register corresponds to the fractional phase value PH-FRC, and is decoded (3b-to-8b) to drive the S[7:0] and T[7:0] inputs. This delay is in increments of 1/64th of a reference signal cycle, ranging from 0/64 cycle to 63/64 cycle. Further detail regarding the timing delays for the fractional phase adjust circuit 206 are described below.

FIG. 16a further shows a magnified view of the circuit detail associated with an exemplary delay element D. Each delay cell contains an inverter pair I1 and I2 with a capacitor load including capacitors C1 and C2 connected via respective pass transistor devices N1 and N2. The pass devices have respective gate terminals responsive to an analog control voltage. This allows the loaded pair delay to be reduced across a range of delay. One or more buffers B1 in the cell allow the signal to be tapped at any point in the delay chain.

Figure 16B:
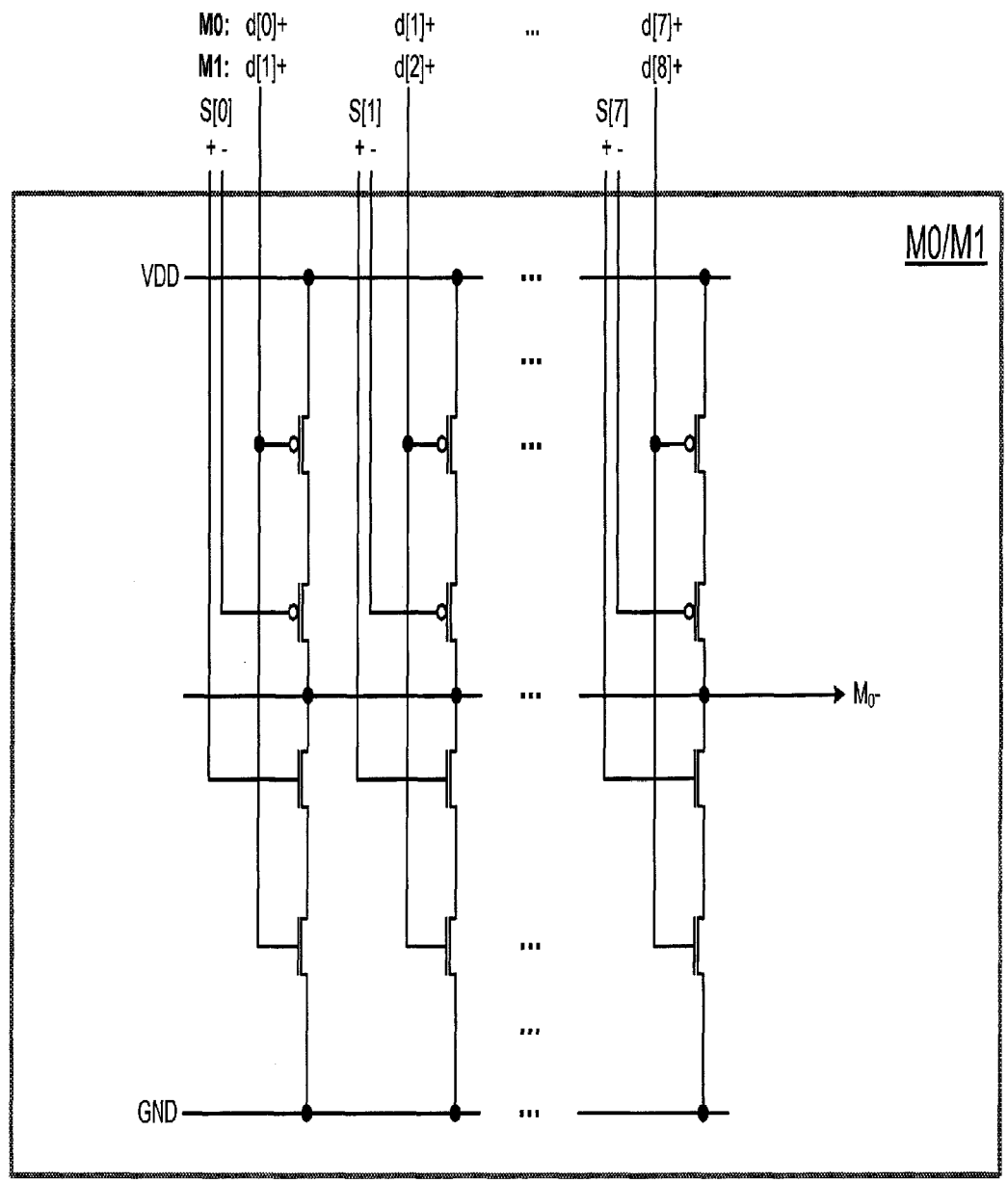

FIG. 16b illustrates further detail relating to one embodiment of a multiplexer configuration used to realize the multiplexers M0 and M1 shown in FIG. 16a. Each multiplexer employs a CMOS and-or-invert configuration, with eight pairs of control signals S[0]-S[7] and nine data inputs d[0]-d[8] from the delay element chain 1602.

Figure 16C:
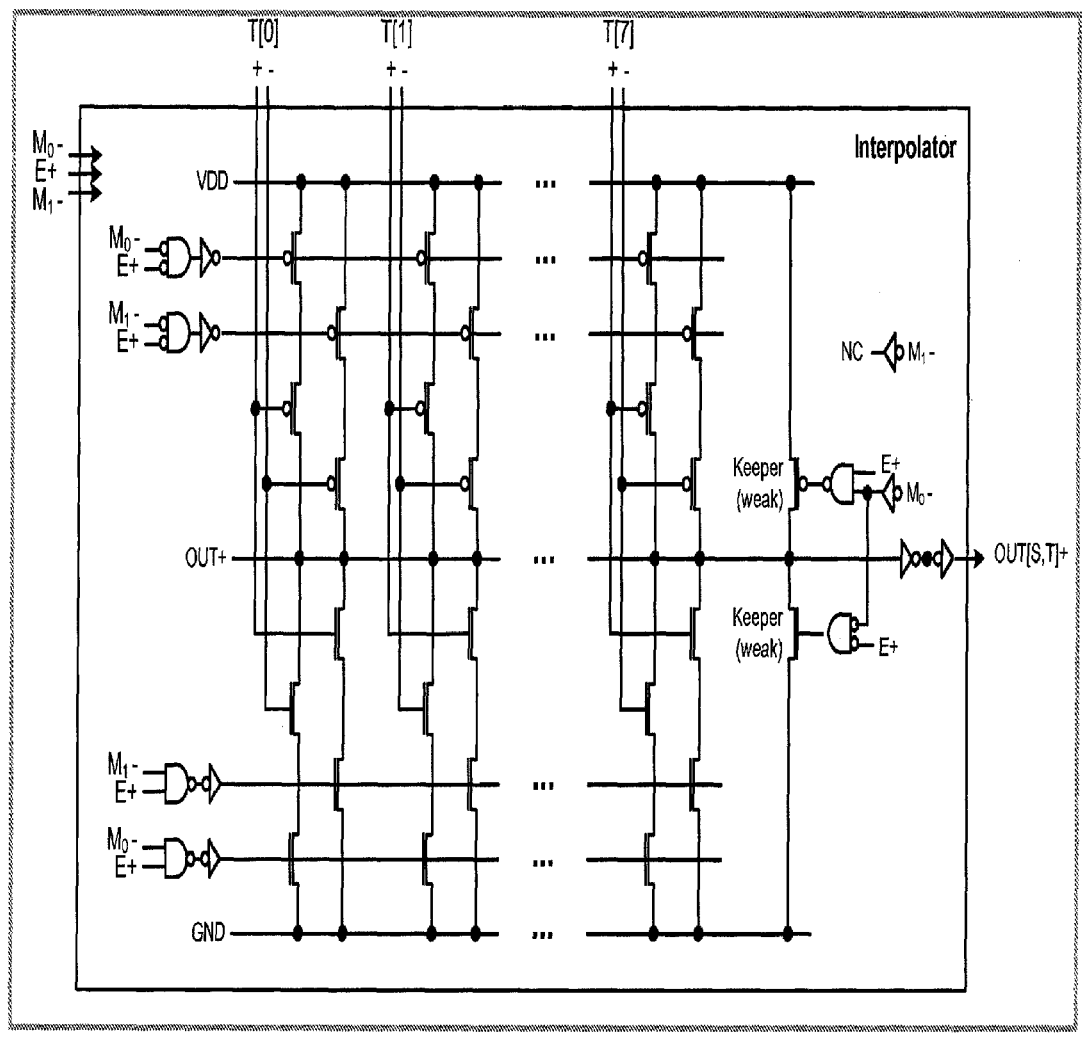

FIG. 16c illustrates the circuit detail of the interpolator 1604 of FIG. 16a. This circuit uses the pair of coarse delays selected by the multiplexers M0 and M1, and turns on from one to eight of the M0 legs and from zero to seven of the M1 legs of the segmented gate using a thermometer code T[7:0]. An enable signal E+ represents a delayed version of the output used to enable either the upper legs or the lower legs for a particular rising or falling transition (to ensure that an upper leg and a lower leg are not on simultaneously).

Figure 17:
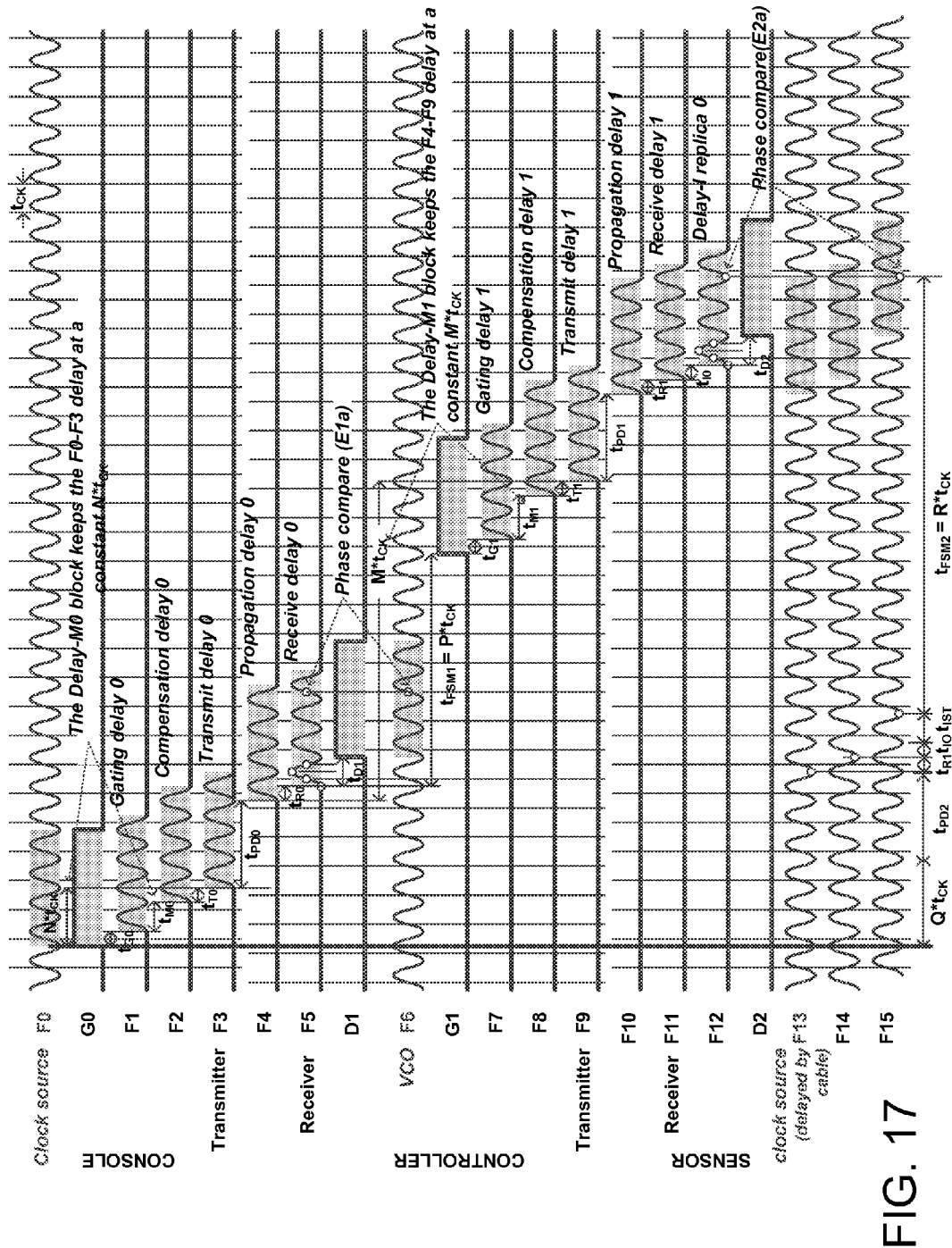
FIG. 17 illustrates the signaling and timing during operation of select portions of the tracking system of FIG. 11.
Figure 18:
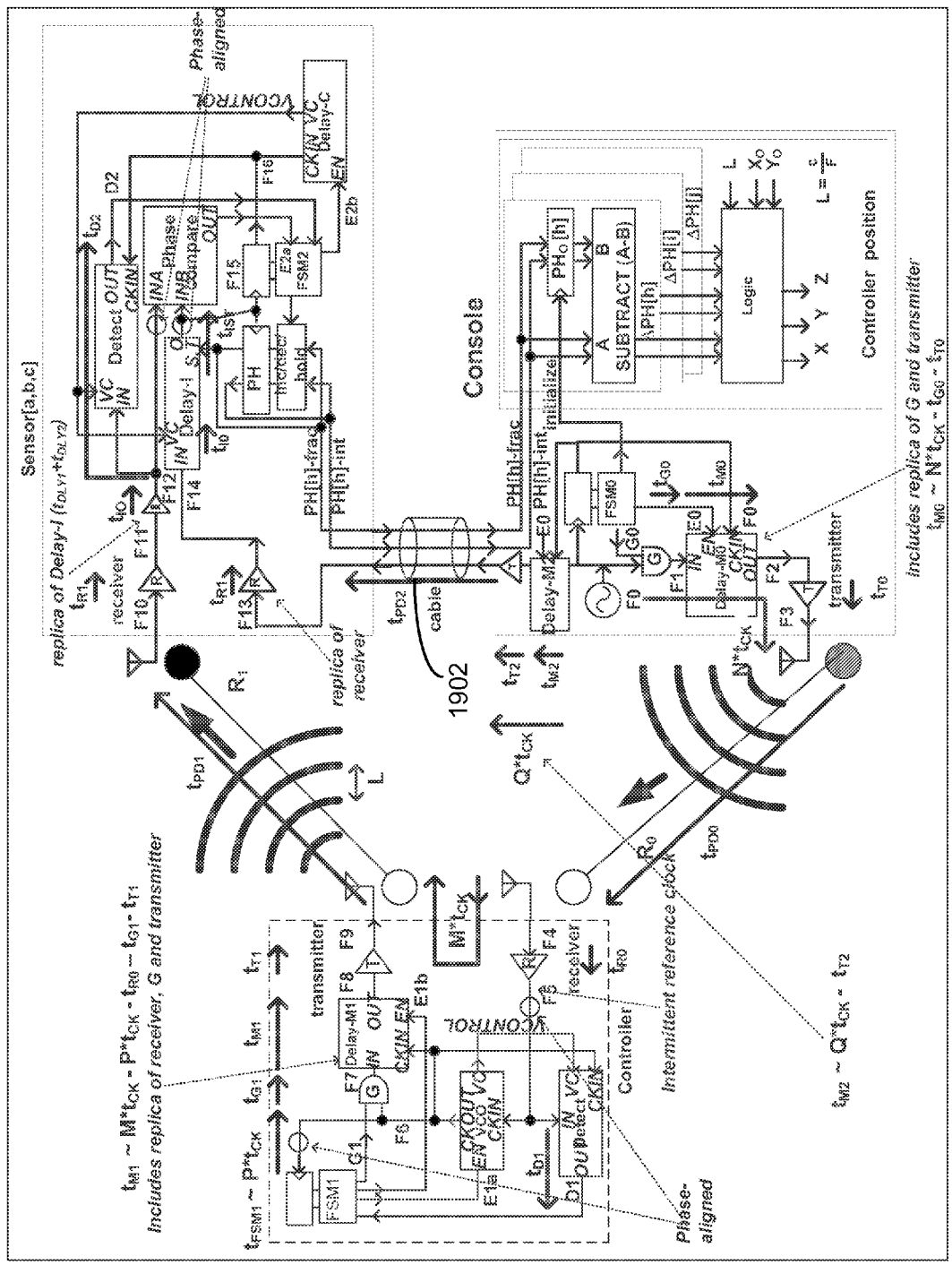
FIG. 18 illustrates the tracking and target devices of FIG. 11 including the signaling and timing notations corresponding to the timing and waveforms of FIG. 17.

FIGS. 17 and 18 illustrate the round-trip timing and delays associated with an exemplary burst transmission in accordance with the drift compensating tracking system of FIGS. 11-16. FIG. 17 represents a timing chart that progressively shows the propagation of a burst, beginning from when it is generated in the console 106 (waveforms G0, and F0-F3 of FIG. 11), continuing as it propagates to the target device 104 (waveforms F4-F9 of FIG. 11), and concluding as it propagates to the sensor circuitry (waveforms F10-F15 of FIG. 11). FIG. 18 illustrates the burst propagation delays along the system paths.

FIG. 18 illustrates a system and signal flow diagram for the drift compensating tracking circuit of FIG. 11. At a high-level, there are two timing paths being compared. The first starts at the F0 node and passes along the R0 and R1 paths to the INA input of the phase comparator. The second starts at the F0 node and passes along the cable to the INb input of the phase comparator in the sensor circuit. Most the timing intervals along the two paths are either [1] an integer number of cycles (clocked by a state machine) or [2] an integer number of cycles controlled by a feedback loop in a compensation circuit, or [3] an integer+fraction number of cycles that is replicated in both paths.

In some cases of [1] and [2] above, the number of integer cycles of delay will be fixed, and in some cases it will vary across a small range of integer values. The latter will describe the delay of the FSM1 and FSM2 state machines ($t_{FSM1}$=P*$t_{CK}$ and $t_{FSM2}$=R*$t_{CK}$) since each interval will be triggered by detection of a receive signal, which could have some variability of a few cycles. Note that this will not affect the phase comparison step, since this is only concerned with the phase difference that is a fraction of a cycle. As a result, only three parameters affect the fractional phase difference PH-FRC that is observed at the phase comparator. These are the three propagation time parameters $t_{PD0}$, $t_{PD1}$, and $t_{PD2}$ (along the cable). The cable delay is fixed, and can be calibrated out via one of the initialization methods, allowing the propagation delays $t_{PD0}$+$t_{PD1}$ (and the propagation path lengths) to be initially calibrated and tracked with periodic updates.

With continued reference to the system configuration of FIG. 18, and referring back to the timing chart of FIG. 17, the waveforms F0 through F3 reside in the clock domain defined by the F0 reference signal. The heavy vertical line at 1902 denotes the initial measurement point. The phase reference point moves by $t_{G0}$+$t_{m0}$+$t_{T0}$, the delay associated with the console gate G, the delay circuit Delay-M0, and the transmitter T. The sum of these delays is constrained to be N*$t_{CK}$ by the delay circuit Delay-M0. The signal propagates from F3 to F4, requiring time $t_{PD0}$.

The waveforms F4 through F9 are in the clock domain defined by the controller VCO output signal F6. The delay between the F4 signal input and the VCO output signal F6 is $t_{R0}$, the receiver delay. Measured from the F4 signal input, the phase reference point moves by $t_{R0}$+$t_{FSM1}$+$t_{G1}$+$t_{M1}$+$t_{T1}$, the delay associated with the receiver R, the state machine FSM1, the gate G, the Delay-M1 block, and the transmitter T. The $t_{FSM1}$ delay is an integer number of clock cycles P*$t_{CK}$. This $t_{FSM1}$=P*$t_{CK}$ interval is dependent upon detection of a receive signal, which could have some variability of a few cycles. The end of the interval is a fixed number of cycles after detection, timed by the FSM1 state machine. Thus, the overall length of the $t_{FSM1}$=P*$t_{CK}$ interval could have some variability of a few cycles. Note that this will not affect the phase comparison step, since this is only concerned with the phase difference that is a fraction of a cycle.

The sum of the other delays is constrained to be (M1)*$t_{CK}$ by the compensation circuitry, where M=P+M1. This means the overall delay from F4 to F9 is M*$t_{CK}$. The signal propagates from F9 to F10, requiring time $t_{PD1}$. The waveforms F10 through F15 are in the clock domain defined by the F15 adjusted phase signal. Measured from the F10 input, the phase reference point moves by $t_{R1}$+$t_{T0}$, the delay associated with the receiver R, and the replica delay $t_{T0}$.

The phase reference point defined by the F0 reference signal moves along a second path. Starting at F0, it is delayed by $t_{M2}$+$t_{T}$, the delay associated with the compensation circuit, and the transmitter T. The sum of these delays is constrained to be Q*$t_{CK}$ by the compensation circuit. Alternately, the respective compensation circuits could be eliminated and replica delays used to match the path from F0 to F3 and the path from F0 to the beginning of the cable.

The signal propagates to F13, requiring time $t_{PD2}$. In one embodiment, this path is along a transmission line composed of conductors separated by insulating material. Typically, the propagation speed of the voltage/current wavefronts in such a medium is less than that of electromagnetic radiation in free space. The speed reduction is a scale factor proportional to the inverse square root of the relative dielectric constant of the insulating material. Typically the reduction is to a speed approximately ½ that of free space. The relationship between time and distance will be different for this path compared to the two paths through free space, and the calibration processes will need to account for it. The phase reference point defined by signal F13 undergoes further delay, moving by $t_{R1}$+$t_{FT0}$+$t_{IST}$+$t_{FSM2}$, the delay associated with the receiver R, the circuit overhead of the phase adjuster block Delay-I, the programmed phase delay (equal to $t_{CK}$*(8*S+T)/64), and the state machine FSM1. The $t_{FSM2}$ delay is an integer number of clock cycles R*$t_{CK}$. This $t_{FSM2}$=R*$t_{CK}$ interval is dependent upon detection of a receive signal, which could have some variability of a few cycles. The end of the interval is a fixed number of cycles after detection, timed by the FSM2 state machine. Thus, the overall length of the $t_{FSM2}$=R*$t_{CK}$ interval could have some variability of a few cycles. Note that this will not affect the phase comparison step, since this is only concerned with the phase difference that is a fraction of a cycle.

The sum of the other delays is approximately matched by the equivalent delays in the other path, except for the programmed delay $t_{IST}$. As a result, when the phase comparison enabled by E2a is performed, it will compare the relative phase of $t_{PD1}$+$t_{PD2}$ against $t_{PD2}$+$t_{IST}$. Changes in $t_{PD1}$+$t_{PD2}$ will be reflected by changes made in the $t_{IST}$ value to match it. If the high order phase value PH-INT is correctly initialized and it absorbs carry/borrow from PH-FRC (determining $t_{IST}$) then the system can track phase changes greater than one cycle.

Additionally, the $t_{D1}$ and $t_{D2}$ detection delays are shown in FIG. 17. These delays are shown as small intervals for clarity. In a real system, they represent the time needed for a received signal to go from zero to full amplitude with stable phase. This will typically be at least several cycles. The $t_{D1}$ and $t_{D2}$ detection delay times do not affect the determination of relative phase in the system, because the phase comparison points can be scheduled (by state machines FSM1 and FSM2) to be many cycles after the received signal first begins to increase in amplitude, at a point where the phase is stable. This makes a large difference in the accuracy of the system; using the 64-step phase adjuster in the preferred embodiment, the time/distance resolution in the round trip path is about 6 ps/2 mm, for a one-way distance resolution of about 1 mm.

If the system relied instead of detecting the beginning of a cycle burst to perform a time-of-flight measurement, the error would be on the order of several cycles. The time/distance resolution in the round trip path would be about 800 ps/25 cm, for a one-way distance resolution of about 12.5 cm, or over 100 times worse.

It might be possible to use a time-of-flight method for determining initial position (as described in initialization method 5), with the more accurate phase measurement method used for relative positioning updates. If higher frequency signals could be used, the accuracy of time of flight could also be improved, and this could provide an alternative method for tracking. In this case, the $t_{D1}$ and $t_{D2}$ detection delays would become part of the timing path from F0 to F12, and the phase measurement made at E2a would turn into a measurement of a pulse position, providing the $t_{PD1}$+$t_{PD2}$ time directly, without initialization.

Figure 19:
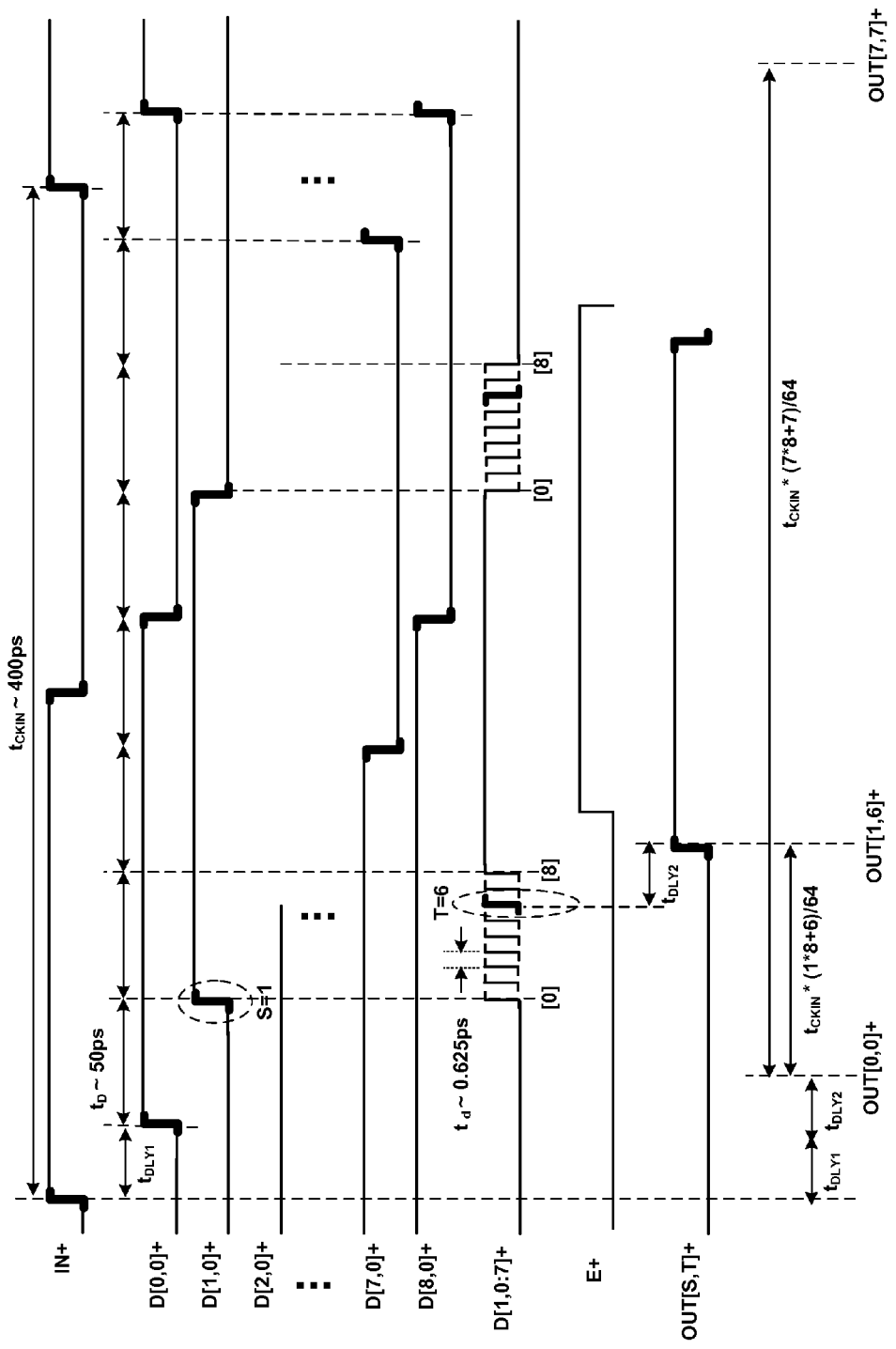
FIG. 19 illustrates one embodiment of the timing of various signals employed in the control delay circuit of FIG. 15.

FIG. 19 illustrates further detailed relative timing between selected waveforms in the phase adjust circuit 206 of FIG. 16. The input signal IN+ corresponds to F14 and has the indicated cycle time $t_{CKIN}$. Although the waveform is shown with short transition times for clarity, it is likely that the transition times would be longer in an actual implementation. Waveforms D[0,0]+, D[1,0]+, . . . D[8:0]+ represent the coarse delay taps of the nine element delay chain 1602, spaced at approximately 50 ps intervals (⅛th of the 400 ps cycle time). The D[1,0]+ and D[2,0]+ coarse delay taps are selected by the multiplexers M0 and M1. The interpolator block 1604 selects a fine adjustment at a point ⅝ of the way between these two coarse delay taps. Note that there are unavoidable circuit delays of $t_{DLY1}$ and $t_{DLY2}$. This means the final delay of the IN+ input signal is $t_{DLY1}+t_{DLY2}+t_{CKIN}*(1*8+6)/64$. The replica delay block 1404 creates the delay $t_{DLY1}+t_{DLY2}$ in the path of the F12 signal which is phase-compared to the output signal F15 of the phase adjustment circuit.

Figure 20:
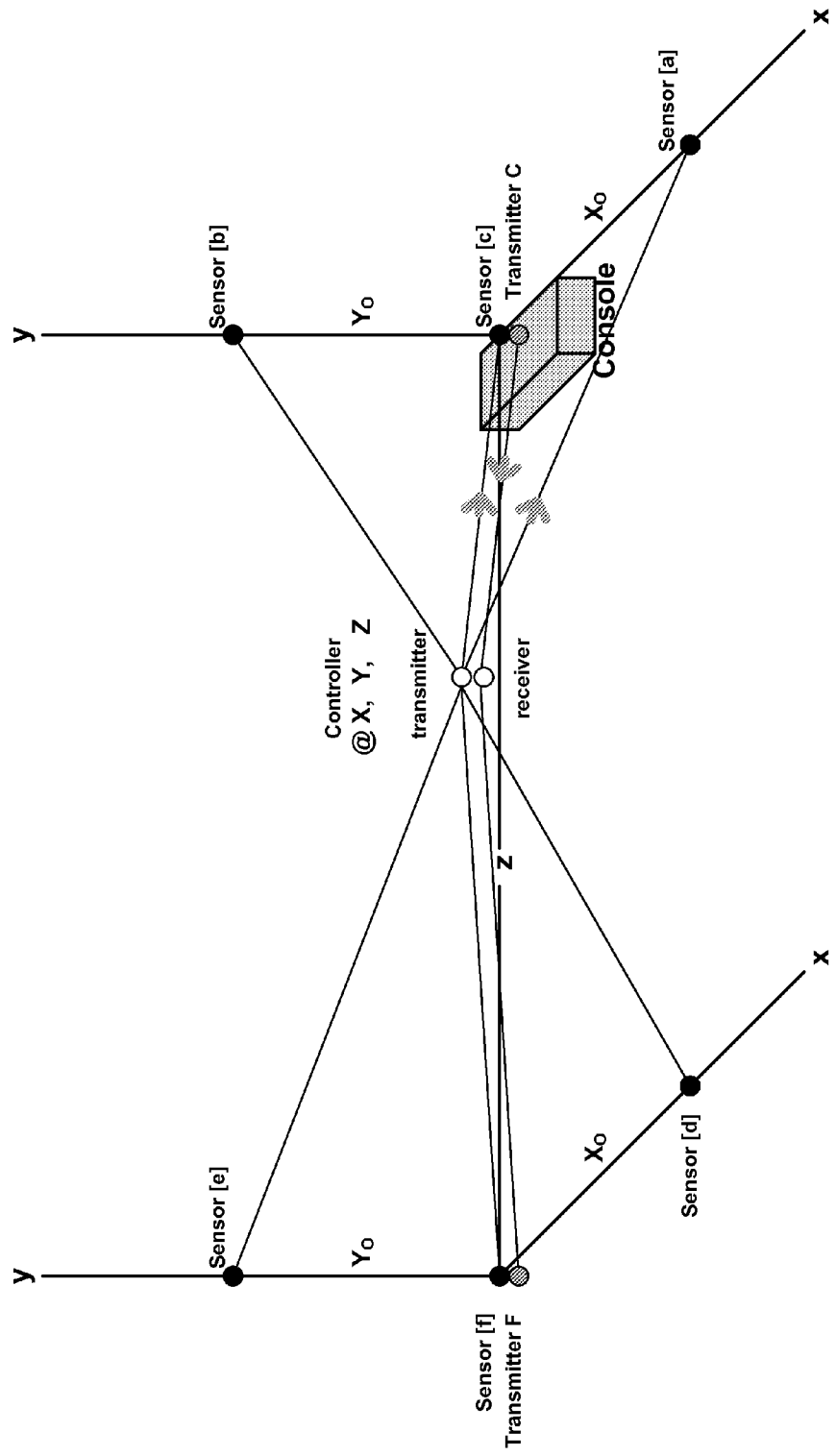
FIG. 20 illustrates a tracking system geometry utilizing multiple sensor arrays.

FIG. 20 illustrates a system geometry consistent with FIGS. 11 and 19, and including the optional provision of one or more additional sensor circuits positioned at some distance from the console. This would generally allow a target device position to be tracked from multiple directions in a given volume of space, in case a signal from one direction is blocked. In this case, sensors d, e, f and transmitter F provide coverage for target devices that might otherwise be obscured by intervening objects. The position of the sensors d, e, f and transmitter F can be established by sensors a, b, c and transmitter C using the triangulation techniques described above.

While a variety of tracking system embodiments have been described above, they all rely on some level of initialization for optimal tracking accuracy. A mechanical method of initialization was previously described herein, and works well for most applications. Arbitrary target device positions can be premeasured, with the appropriate value loaded into the PH register 210 or loaded into a console register 302 so that the proper ΔPH values can be computed for each sensor. In addition to the mechanical initialization method, the disclosure above described a fast-gating method. The fast gating process assumes that the enable/gating circuitry and the signal detection circuitry used for time-slicing the signals is responsive enough it can be used to measure the time of flight of a cycle burst launched through the first and second paths. There is likely to be an error on the order of a few cycles of time/distance because of circuit delay, but this may be adequate for computing an approximate initial position. (Note that this circuit delay is not present in the phase difference approach described in earlier embodiments).

Figure 21:
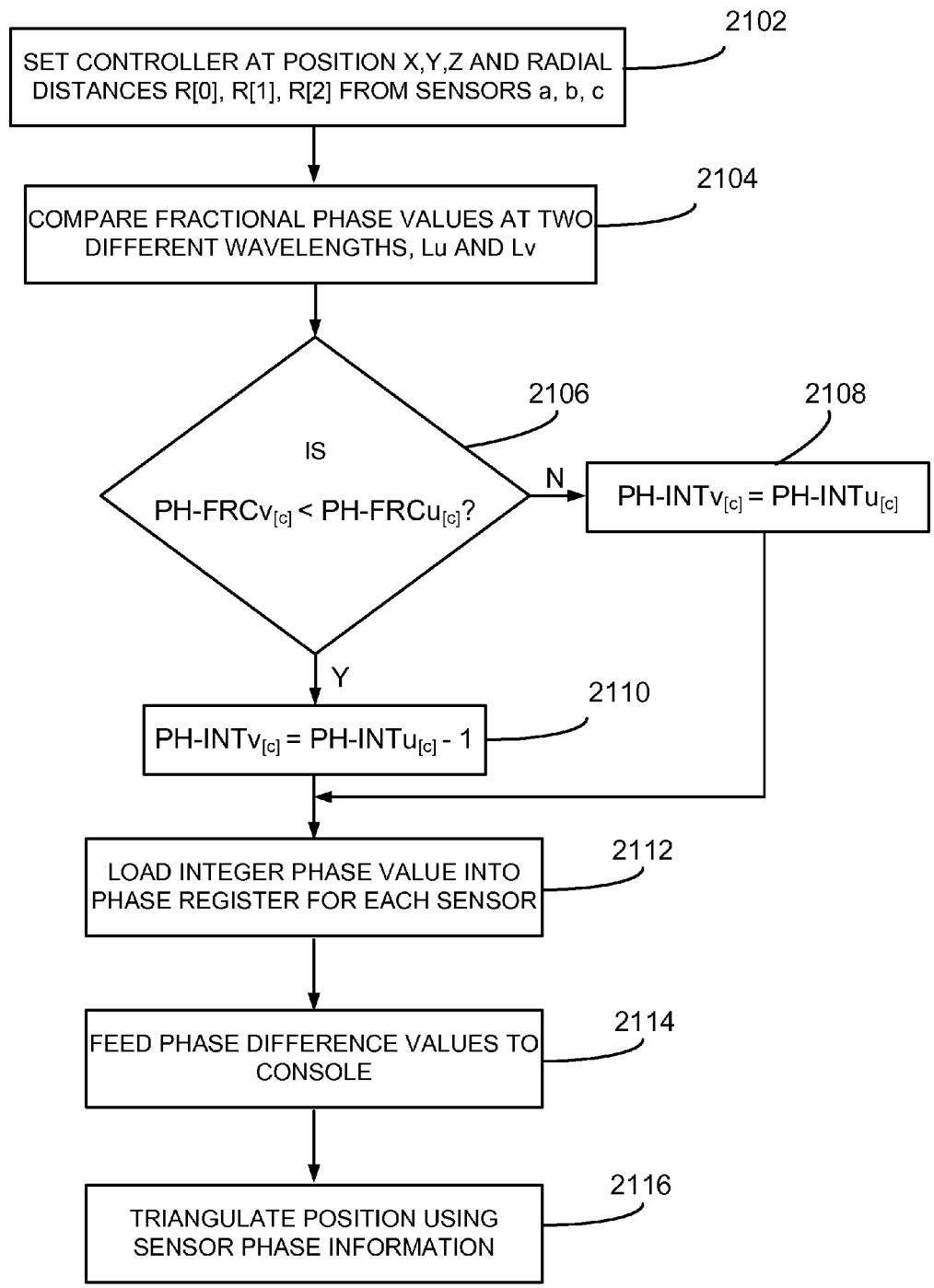
FIG. 21 illustrates a flowchart setting forth one embodiment of a differential wavelength method of initializing a tracking system.

FIG. 21 illustrates yet a further way to initialize any of the tracking system embodiments described above. The method employs a differential wavelength method that allows an arbitrary position to be initialized by making measurements of PH-FRC at two different wavelengths.

Further referring to FIG. 21, the differential wavelength method involves setting the target device at a position X, Y, Z, and at radial distances R[0], R[1], and R[2] from sensors c, a, and b, at step 2102. The distances Xo and Yo are known, and their effect on the phase comparison can be subtracted out, as can any other fixed circuit delays. The total phase delay is [PH-INT+PH-FRC]; an integral number of wavelengths plus a fractional wavelength. The phase comparison circuit can only measure the PH-FRC fractional value. The phase comparison is made at two wavelengths: a standard wavelength Lu used for normal operations as described above, and a second wavelength Lv=(1+h)*Lu. The parameter h is small (0.01 for example). With a small value of h, the integer phase value may be expressed by PH-INTv=PH-INTu-{0,1}. These two cases can be distinguished by comparing the fractional phase value at the first wavelength PH-FRCu and the fractional phase value at the second wavelength PH-FRCv, at step 2104. At step 2106, a determination is made as to whether the fractional phase value at the standard wavelength is greater or less than the fractional phase value at the second wavelength. If the value at the standard wavelength is greater than the value at the second wavelength, then the following relationships are selected at step 2108 to calculate the integer phase value:

PH-INT$v_{[c]}$=PH-INT$u_{[c]}$

PH-INT$u_{[c]}$=[PH-FRC$u_{[c]}$−(1+h)*(PH-FRC$v_{[c]}$)]/h

If the value at the standard wavelength is less than the value at the second wavelength, then the following relationships are selected at step 2110 for the integer phase value:

PH-INT$v_{[c]}$=PH-INT$u_{[c]}$−1

PH-INT$u_{[c]}$=[PH-FRC$u_{[c]}$−(1+h)*(PH-FRC$v_{[c]}$−1)]/h

Depending on the comparison result, the integer phase value is loaded into the phase register for each of sensors c/a/b, at step 2112. The h parameter must be greater than the relative phase comparator resolution DL/Lu. It must also be less than the ratio of Lu/Rmax, the inverse of the size of the initialization radius in wavelength units. The respective phase values are then passed to the console, at step 2114, where the target device position may be determined through the triangulation principles described herein, at step 2116.

For a 2.5 GHz signal with 12 cm wavelength and phase comparator with 64 steps per cycle, h must be greater than about 0.016 and this will yield a 12 meter initialization radius. For a 0.433 GHz signal with 72 cm wavelength and phase comparator with 256 steps per cycle (9 ps resolution, h must be greater than about 0.004 and this value will yield a 200 meter initialization radius. A refinement that could be made would be to make the choice of h adaptive, depending upon the distance the object was from the console. A different value of h could be used for different initialization position values. This could be done by starting with a small value of h and increasing it until PH-FRCv became smaller than PH-FRCu by some threshold amount (say 5 steps of the phase adjuster).

Other forms of initialization may also work well with the tracking system embodiments described above, including very-long wavelength, and optical (imaging)-based methods. For example, a very-long wavelength method allows an arbitrary position to be initialized. It uses a second wavelength that is very long, comparable to the maximum position radius needed. A 6-meter radius would correspond to a frequency of about 50 MHz. This would ensure that the PH-INT value was zero, and the PH-FRC value represented the total propagation delay of the signal paths. This method requires that the very-long wavelength signal utilize a phase comparator/adjustment with correspondingly more adjustment steps to give a similar time/position resolution for the initial position.

As an alternative initialization method, an optical/image-based process utilizes a camera to determine the initial position of an object. This could be an option if a camera was available for online gaming, medical procedures, or for gesture recognition or some other primary purpose. The initialization procedure would represent a secondary function.

Figure 22:
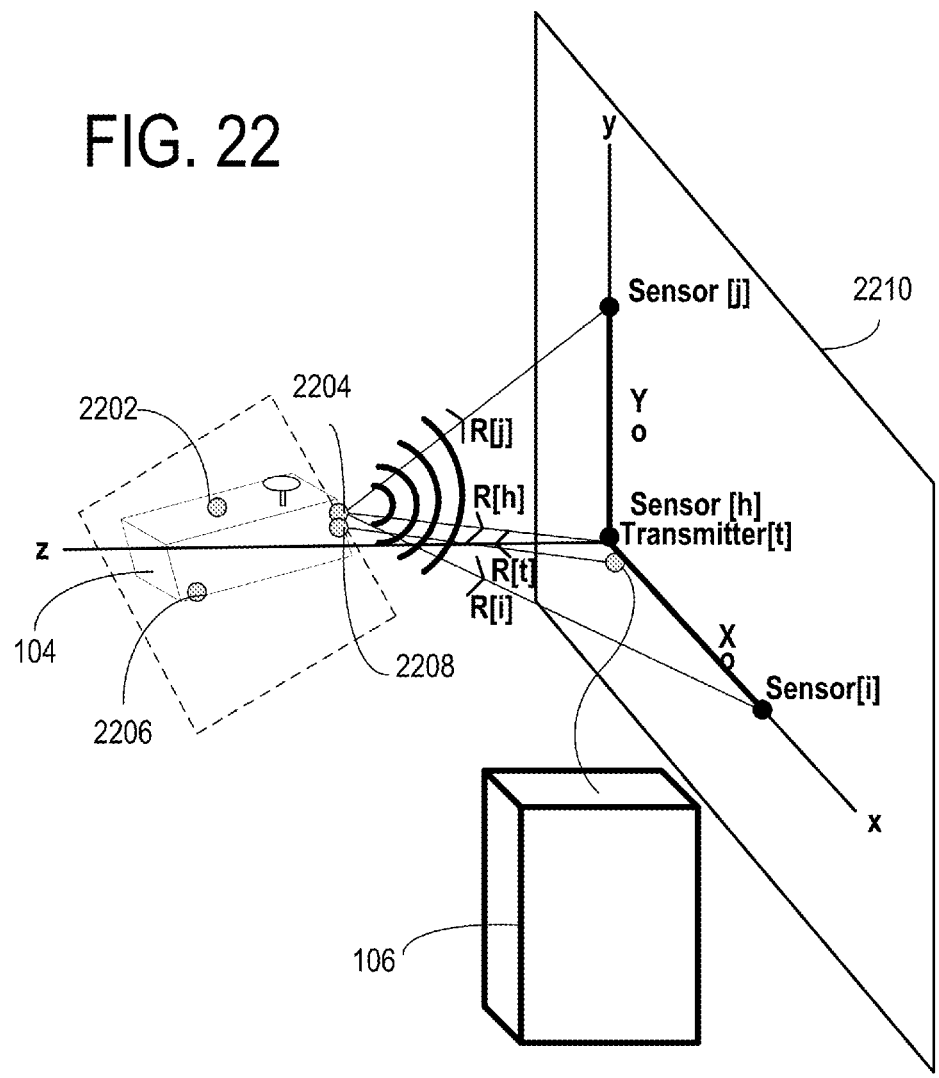
FIG. 22 illustrates one embodiment of a tracking system that employs a multi-tracking controller to determine the controller orientation and position.

FIG. 22 illustrates a further embodiment of a tracking system, generally designated 2200, that includes a target device 104 that employs multiple tracking points. In one embodiment, multiple transmitters 2202, 2204, and 2206 are implemented that share a single receiver 2208. The system further includes a console unit 106 and a plurality of sensor circuits 108a-108c disposed on, for example, a wall 2210. The console and sensor circuits may employ constructions similar to those described in previously disclosed embodiments. By providing multiple tracking points in the target device 104, the console 106 can not only determine the relative position of the target device with respect to the console, but also the orientation of the target device at that position, such as a relative elevational (pitch) or lateral (yaw) angle. Initialization of the multiple tracking points may be accomplished with any of the methods described above. The multi-tracking target device eliminates the need for orientation devices disposed internal to the target device, thereby simplifying target device construction and reducing associated costs.

Figure 23:
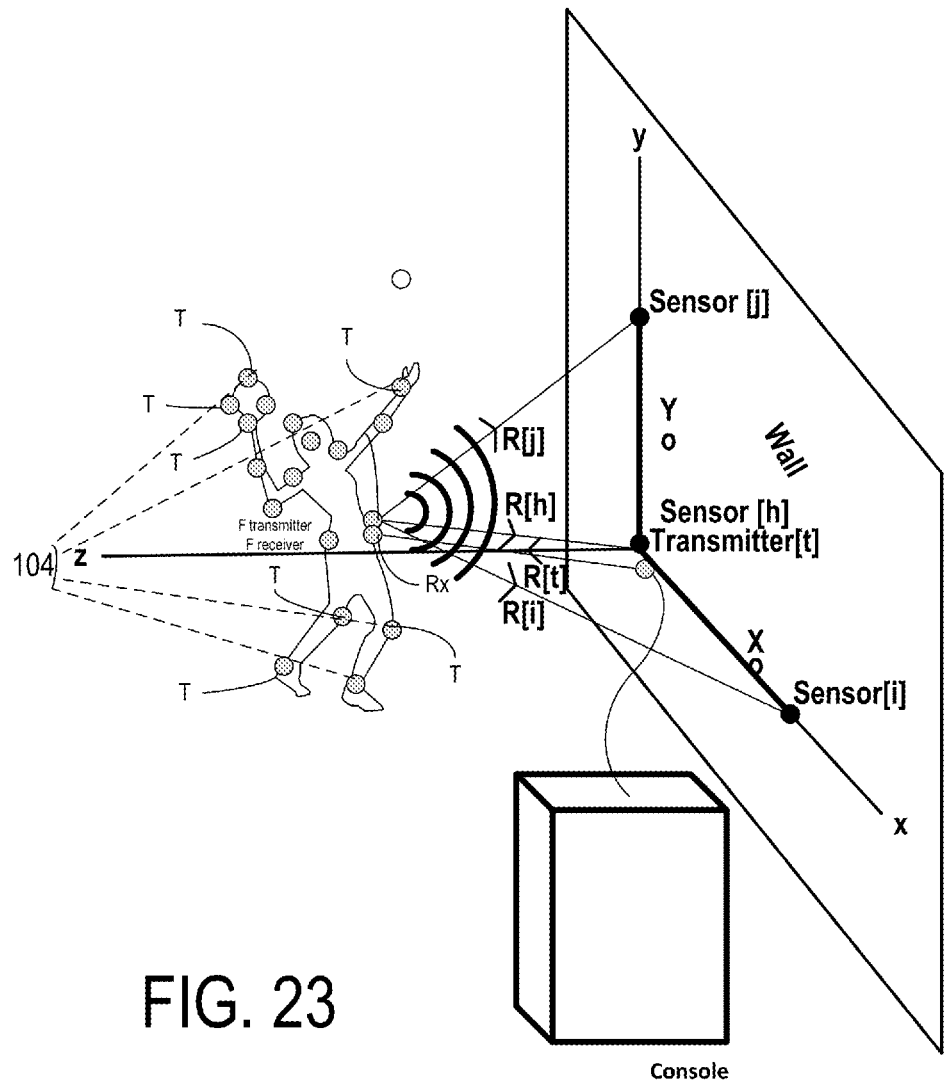
FIG. 23 illustrates a specific application for the tracking system of FIG. 22.

FIG. 23 illustrates one specific gaming application of the multi-transmit target device described above for use in a tracking system. Rather than being implemented as a handheld mobile device, the target device 104 includes a series of transmitters T that share a single receiver Rx, all of which are disposed on a form of garment or body harness. The target device or controller also includes further circuitry in accordance with any of the previously described controller embodiments. As an example, the orientation of a person's body may be detectable through sufficient transmitter density over a wearable garment, such as at key body joints. Embodiments described above relating to multiple tracking points (such as multiple controllers) or multiple redundant frames lend themselves well to this application since the risk of obscured tracking points is reduced. A flexible initialization approach, such as the differential wavelength method described above, works well for this implementation.

Figure 24:
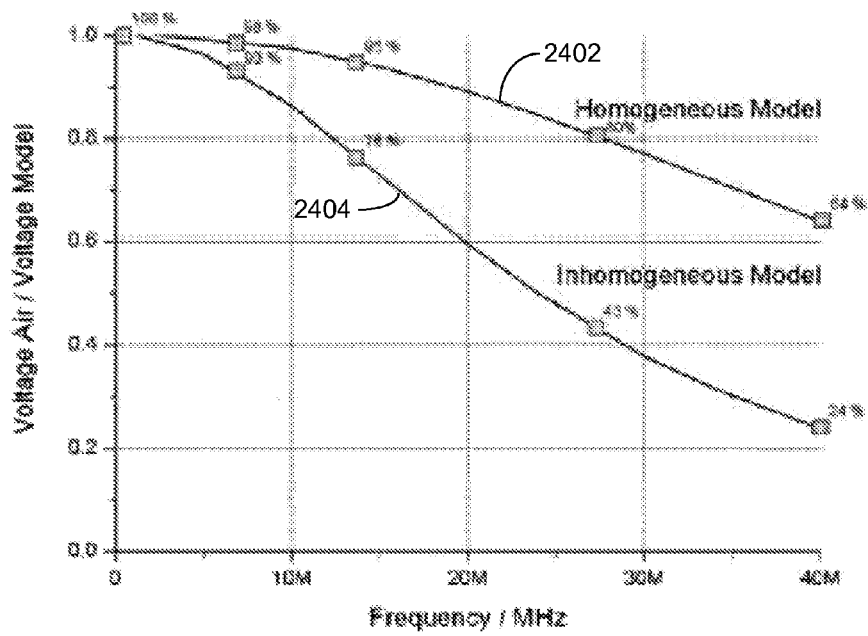
FIG. 24 graphically illustrates voltage versus frequency for a transponder directing wireless signals through human tissue.

The structure and operating characteristics of the tracking system embodiments described above lend themselves well to medical applications involved in treating the human body. This is due in large part to the range of frequencies involved in operating the tracking systems, and signal absorption characteristics exhibited by human tissue. FIG. 24 illustrates how wireless signal power falls off when transmitted through human tissue as a function of frequency. A first curve representing a "Homogeneous Model, at 2402, represents how power (in terms of a voltage ratio) falls off as wireless frequencies increase and propagate through the same type of tissue. A second curve, at 2404, shows a more dramatic form of attenuation for signal propagation through different, or inhomogeneous tissue. Of note is that at 40 MHz, the power associated with wireless signals propagating through homogeneous tissue falls off to 64% of the original level, and for inhomogeneous tissue, the level drops off to 24%.

Figure 25:
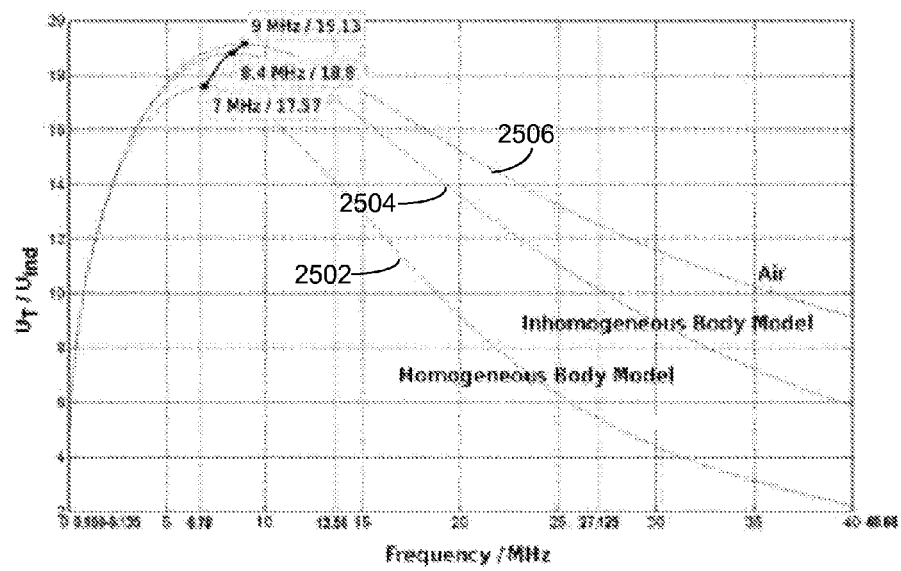
FIG. 25 graphically illustrates plural power delivery curves as a function of frequency for wireless signals propagating through various media.

FIG. 25 illustrates similar power versus frequency curves, but in a manner that shows the optimum frequencies for wireless signal propagation through homogeneous tissue, at 2502, inhomogeneous tissue, at 2504, and as a reference, air, at 2506. The respective optimal frequencies that correspond to the curves are 7 MHz, 8.4 MHz, and 9 MHz. Such frequencies are precisely within the optimal range of frequencies provided by the tracking systems disclosed herein.

A variety of medical procedures are enhanced by employing any of the tracking system embodiments described herein. For such applications, a tracking device in accordance with one or more embodiments described above would generally be set up within an office or room suitable for carrying out invasive surgical procedures. A target device consistent with one or more embodiments described herein would be formed in a sealed capsule or other structure allowing it to be invasively inserted into a human body via, for example, a steerable catheter or the like. Having the ability to track and monitor the position of the capsule while it is inside the body enhances medical procedures such as those described below.

Figure 27:
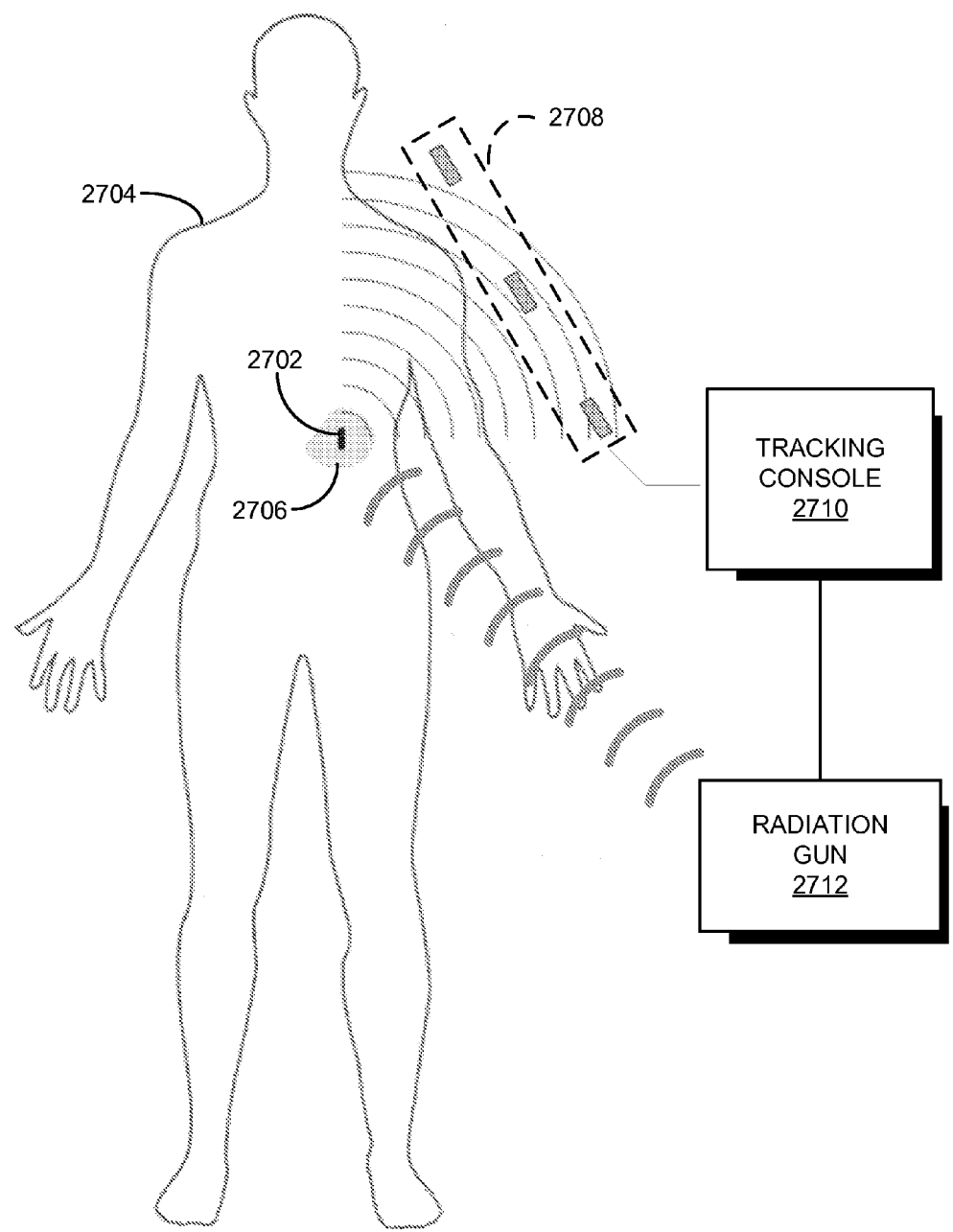
FIG. 27 illustrates a human body being irradiated with a radiation treatment consistent with the method of FIG. 26A.

FIGS. 26A and 27 illustrate steps involved in treating a human body with targeted doses of radiation. Such therapy is often used to destroy cancerous tumors. When applied precisely, the therapy may be constrained to eliminate substantially only cancerous tissue, while preserving non-cancerous tissue. Utilizing the tracking system described herein enables this type of precision at relatively low cost.

Further referring to FIGS. 26A and 27, the procedure begins by introducing a wireless capsule 2702 that includes a target device into a human body 2704, at step 2602. The capsule may be surgically implanted proximate a cancerous tumor 2706 in a variety of ways, including first mounting the capsule on the tip of a catheter, and navigating the catheter, at step 2604, such that the capsule is located adjacent the tumor. Other invasive forms of capsule insertion directly adjacent the tumor location are also possible that may not involve navigating via a catheter.

Once the capsule is inserted and delivered to the desired tumor location, its position may be detected in 3-dimensional space via any of the triangulation techniques described above, at step 2606, utilizing a non-colinear sensor array 2708 and tracking console 2710. Coordinates corresponding to the capsule location (and tumor location) may then be passed to a radiation gun 2712 having a coordinate system calibrated to the tracking system coordinate space. With the coordinates of the capsule and tumor known to a high degree of precision, a radiation beam emanating from the radiation gun 2712 may be precisely steered to irradiate tumor locations, at step 2608, with minimal damage to non-cancerous tissue. In some embodiments, the capsule is left in place inside the body for multiple radiation sessions spanning days or weeks.

Steering the radiation beam based on the triangulated position of the capsule as described above not only provides a precise and low-cost way to accurately deliver radiation therapy at a given instant in time, but it also enables for dynamic tracking of the tumor over longer intervals as a result of body movements. For example, tumors of the lung may regularly move as a result of normal inhaling and exhaling of the lungs. Prostate tumors may also move during radiation therapy due to bowel and/or bladder functions. By correlating the radiation gun steering coordinates to the tracked capsule coordinates, dynamic movements of the tumor, and the adjacent capsule, may be compensated to ensure a direct application of radiation therapy to the tumor with minimal damage to healthy tissue as a result of movement.

Figure 28:
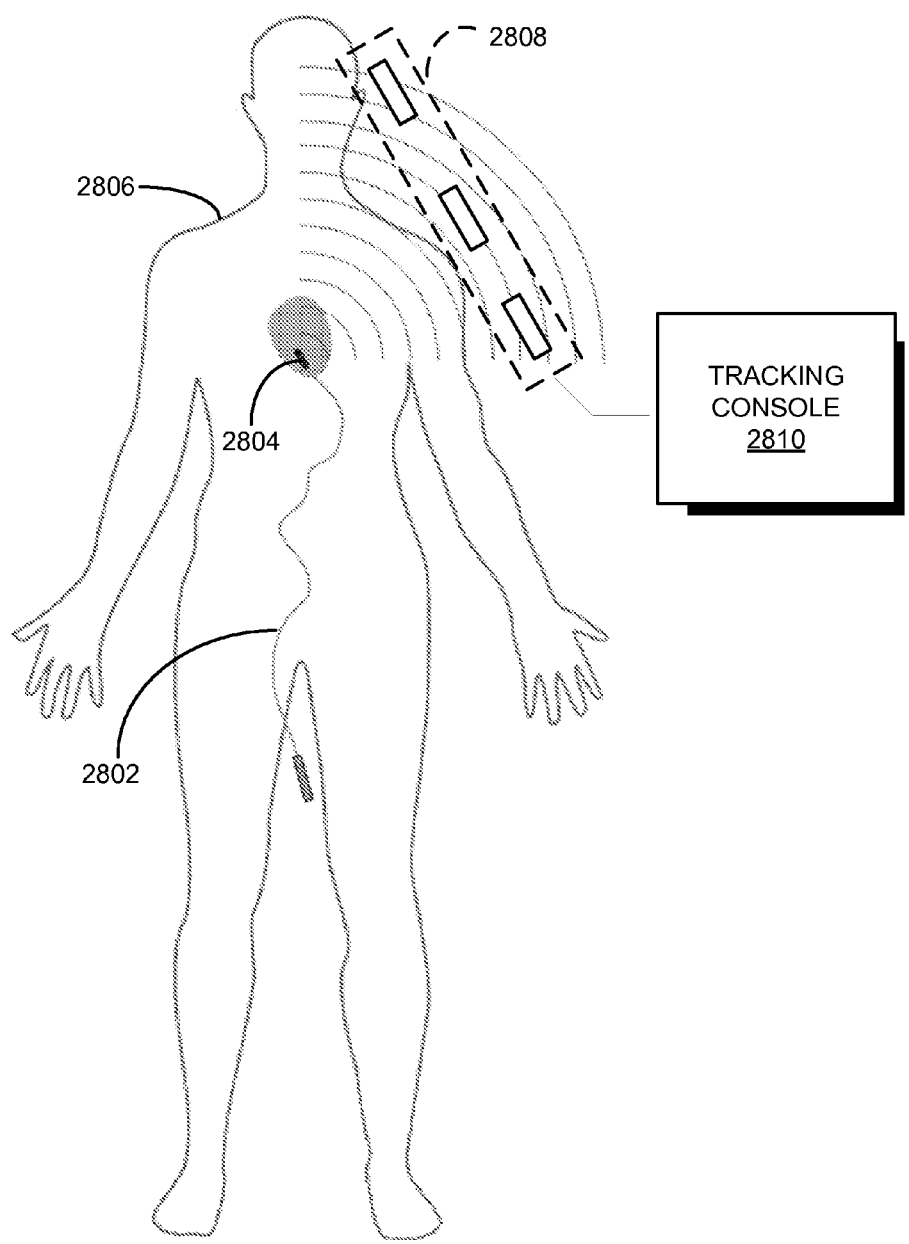
FIG. 28 illustrates a human body undergoing an angioplasty/stent delivery procedure consistent with the method of FIG. 26B.

FIGS. 26B and 28 illustrate steps involved in tracking and guiding a catheter 2802 (FIG. 28) to a desired location in order to administer an angioplasty (widening an artery or vein through removing plaque or other blockage or the like), to deliver a stent, or otherwise guide a device through the body in an accurate but low-cost manner. The method begins by intravenously introducing a capsule 2804 including a wireless tracking device into a human body 2806 via the catheter, at 2610 (FIG. 26B). The catheter is steered to a desired location along a specified route through the circulatory system, at step 2612. To aid in guiding the catheter, the capsule position is monitored, at step 2614, by a tracking system including a tracking array of sensors 2808 and a tracking console 2810. Once the catheter is in its proper position, such as by aligning a balloon or stent into a desired location (proximate the tracking capsule), the medical procedure involving the angioplasty or stent delivery may take place, at step 2616.

Other medical device applications may also be envisioned where detecting and confirming accurate and consistent positions over time at low cost within a human body may be advantageous. For example, implanted medical devices may be periodically monitored to ensure that they maintain their position within the body by either implanting a tracking capsule adjacent the device, or incorporating the tracking circuitry into the medical device itself. Thus, implantable cardiac devices (ICDs), joint implants, bone screws, and the like may be positionally monitored via any of the techniques described above.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, path widths, processing or operating frequencies, component circuits or devices and the like may be different from those described above in alternative embodiments. Also, the interconnection between circuit elements or circuit blocks shown or described as multi-conductor links may alternatively be single-conductor links, and single conductor links may alternatively be multi-conductor links. Links and signaling paths shown or described as being single-ended may also be differential, and vice-versa. Similarly, links described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of tracking a target device with respect to a tracking device, the method comprising:
   generating by a reference signal source in the tracking device, a reference signal;
   transmitting the reference signal along a first fixed wired path to first gating logic and along a second fixed wired path to a plurality of receivers;
   gating the reference signal by the first gating logic to feed the reference signal to a transmitter only during time intervals when the first gating logic is enabled;
   generating, by the transmitter, a wireless reference burst signal representing the gated reference signal, the wireless reference burst signal comprising a plurality of signal bursts during the time intervals when the first gating logic is enabled;
   receiving at each of the plurality of receivers, a re-transmitted wireless reference burst signal transmitted from the target device, the re-transmitted second wireless reference burst signal re-transmitted by the target device to the plurality of receivers in response to the target device receiving the wireless reference burst signal;
   comparing, with each of the phase comparator circuits, a first phase of the received reference signal to a second phase of the re-transmitted wireless reference burst signal when it is respectively received by each of the phase comparator circuits to generate respective phase comparison signals for each of the phase comparator circuits;
   in each of the plurality of receivers, enabling second gating logic during respective second time intervals following detection of the re-transmitted wireless reference burst signal by the respective phase comparator circuits;

in each of the plurality of receivers, gating the respective phase comparison signals by the respective second gating logics in each of the plurality of receivers to feed the respective phase comparison signals to respective state machines of each of the plurality of receivers only during the second time intervals when the respective second gating logics is enabled to generate respective gated phase comparison signals for each of the respective receivers; and determining, by the state machines for each of the plurality of receivers, a coordinate of the target device in three-dimensional space with respect to a reference coordinate based on the respective gated phase comparison signals generated at each of the respective receivers.

2. The method according to claim 1 wherein determining the coordinate comprises triangulating a position of the target device with respect to the tracking device.

3. The method according to claim 1 wherein the re-transmitted wireless reference burst signal comprises a frequency different from a frequency of the wireless reference burst signal and a phase substantially in-phase with a phase of the wireless reference burst signal.

4. The method according to claim 1, further comprising receiving additional re-transmitted wireless reference burst signals from additional target devices, the additional re-transmitted wireless reference burst signals each having different frequencies.

5. The method of claim 1, further comprising rendering a gaming application environment based on the determined coordinate.

6. The method of claim 1, further comprising directing a medical procedure to a location in a human body based on the determined coordinate.

7. A tracking circuit in an electronic console for detecting the position of a target device, the tracking circuit comprising:
a reference signal generator to generate a reference signal and to transmit the reference signal along a first fixed wired path and along a second fixed wired path;
first gating logic coupled to receive the reference signal from the reference signal generator via the first fixed wired path, and to gate the reference signal to pass the reference signal through the first gating logic only during time intervals when the first gating logic is enabled;
a wireless transmitter coupled to receive the gated reference signal from the first gating logic and to generate a wireless reference burst signal representing the gated reference signal, the wireless reference burst signal comprising a plurality of signal bursts during the time intervals when the first gating logic is enabled;
a plurality of receivers to receive a retransmitted wireless reference burst signal transmitted from the target device, the retransmitted wireless reference burst signal retransmitted by the target device to the plurality of receivers in response to the target device receiving the wireless reference burst signal;
a plurality of phase comparison circuits corresponding to the plurality of receivers, each phase comparison circuit having a first input to receive the reference signal and a second input to receive the retransmitted wireless reference burst signal received by an associated one of the plurality of receivers, each phase comparison circuit comparing a first phase of the reference signal to a second phase of the retransmitted wireless reference burst signal when it is respectively received by each of the phase comparator circuits to generate respective phase comparison signals for each of the phase comparator circuits;
second gating logic in each of the plurality of receivers that are enabled during respective second time intervals following detection of the retransmitted wireless reference burst signal, each second gating logic gating respective phase comparison signals to pass through respective phase comparison signals of each of the plurality of receivers only during the second time intervals to generate respective gated phase comparison signals for each of the plurality of receivers; and
state machines in each of the plurality of receivers to receive the respective gated phase comparison signals and determine a coordinate of the target device in three-dimensional space with respect to a reference coordinated based on the respective gated phase comparison signals.

8. The tracking circuit according to claim 7 wherein the plurality of receivers are user positionable in a non-colinear configuration.

9. The tracking circuit according to claim 8 wherein the transmit circuitry resides at a position coinciding with a position of at least one of the sensor circuits.

10. The tracking circuit according to claim 8 wherein the transmit circuitry resides at a position different from any of the positions of the respective sensor circuits.

11. The tracking circuit according to claim 7 wherein the tracking circuit applies a fixed delay applied to the reference signal, the fixed delay comprising an integer number of waveform cycle times.

12. The tracking circuit according to claim 7 wherein the tracking device is disposed in a video game console.

* * * * *